(12) United States Patent
Hashimoto

(10) Patent No.: US 10,258,116 B2
(45) Date of Patent: Apr. 16, 2019

(54) CLASP

(71) Applicant: Yugen Kaisha Houseki-No-Angel, Aichi (JP)

(72) Inventor: Hisajiro Hashimoto, Aichi (JP)

(73) Assignee: Yugen Kaisha Houseki-No-Angel, Aichi (JP)

( * ) Notice: Subject to any disclaimer, the term of this patent is extended or adjusted under 35 U.S.C. 154(b) by 0 days.

(21) Appl. No.: 15/579,210

(22) PCT Filed: Mar. 27, 2017

(86) PCT No.: PCT/JP2017/012243
§ 371 (c)(1),
(2) Date: Dec. 3, 2017

(87) PCT Pub. No.: WO2017/164414
PCT Pub. Date: Sep. 28, 2017

(65) Prior Publication Data
US 2018/0132576 A1    May 17, 2018

(30) Foreign Application Priority Data

Mar. 25, 2016   (JP) .................................. 2016-079131
Nov. 2, 2016    (JP) .................................. 2016-226328

(51) Int. Cl.
*A44C 5/20*   (2006.01)
*A44B 11/25*  (2006.01)
*F16B 21/04*  (2006.01)

(52) U.S. Cl.
CPC ............ *A44C 5/2057* (2013.01); *A44B 11/25* (2013.01); *A44B 11/2503* (2013.01); *A44C 5/20* (2013.01);
(Continued)

(58) Field of Classification Search
CPC ....... A44C 5/2057; A44C 5/20; A44C 5/2076; A44C 5/2042; A44B 11/2503;
(Continued)

(56) References Cited

U.S. PATENT DOCUMENTS 3,540,091 A *  11/1970  Marosy .................. F16G 15/04
                                                24/573.11
7,564,331 B2 *  7/2009  Hashimoto .......... A44C 5/2042
                                                24/303
(Continued)

FOREIGN PATENT DOCUMENTS

JP   2013-63258 A   4/2013
JP   2014-23565 A   2/2014

OTHER PUBLICATIONS

Office Action and Search Report dated Oct. 23, 2018 by the State Intellectual Property Office of P.R.C. In the Office Action, a box is checked which states that "Claims 1-6 do not possess the inventiveness under Paragraph 3 of Article 22 of the Patent law."

*Primary Examiner* — Robert Sandy
*Assistant Examiner* — Rowland Do
(74) *Attorney, Agent, or Firm* — Takeo Ohashi

(57) ABSTRACT

In a clasp (1), a male member (2) has a columnar insertion portion (23) and a female member (4) has a cylindrical housing portion (43). The clasp (1) has magnets which attract the insertion portion (23) into the housing portion (43). A male engagement body (3) is provided on an outer peripheral surface (23a) of the insertion portion (23) of the male member (2) while a female engagement body (5) is provided on an inner peripheral surface (43a) of the housing portion (43) of the female member (4). The male engagement body (3) and/or the female engagement body (5) is provided as a long protruding edge structure or a long recessed notch structure along the axis of the clasp (1), has (Continued)

a guiding portion (53), and also has a retaining portion (52) which prevents the insertion portion (23) from getting out of the housing portion (43).

18 Claims, 11 Drawing Sheets

(52) U.S. Cl.
CPC .......... *F16B 21/04* (2013.01); *A44D 2200/10* (2013.01); *A44D 2203/00* (2013.01)

(58) Field of Classification Search
CPC ..... A44B 11/25; F16B 21/04; A44D 2203/00; A44D 2200/10; Y10T 24/45016; Y10T 24/4578; Y10S 63/90
See application file for complete search history.

(56) References Cited

U.S. PATENT DOCUMENTS

| | | | |
|---|---|---|---|
| 9,677,590 B2 * | 6/2017 | Oliver | F16B 21/04 |
| 2003/0145442 A1 * | 8/2003 | Hoshino | A44C 5/2061 |
| | | | 24/663 |
| 2016/0058135 A1 * | 3/2016 | Ng | A44C 5/2066 |
| | | | 24/303 |
| 2016/0183642 A1 * | 6/2016 | Fiedler | A45C 13/1069 |
| | | | 24/303 |

\* cited by examiner

CLASP

TECHNICAL FIELD

The present invention relates to clasps, and more particularly, to clasps that are capable of being used as coupling parts in accessories such as a necklace, a bracelet, an anklet, and a key holder, and members of various kinds such as a bag, a belt, and a seat belt, and capable of clasping a pair of members to each other.

BACKGROUND ART

Conventionally known clasps provided to both ends of accessories used in the form of a ring such as a necklace, a bracelet, and an anklet are described in Patent Documents 1 and 2. Patent Document 1 describes a coupling part for self-locking accessory including a pair of a concave portion and a convex portion that each include magnets so that the concave portion and the convex portion are attracted to each other in the direction of the long axis by magnetic attraction force, the concave portion including a pin in the inner side, the convex portion including an edge on the upper outer surface that is arranged to be engaged with the pin.

Patent Document 2 discloses a clasp for accessories that includes a first coupling body including a concave portion for insertion and a second coupling body including an insertion portion that is insertable into the concave portion for insertion, and has a configuration such that attraction force is generated by magnetic attraction force between the first coupling body and the second coupling body. A spiral convex portion including a retaining surface making up a retaining concave portion and a guiding surface is provided to the first coupling body on the inner peripheral surface of the concave portion for insertion of the first coupling body, and a retaining convex portion arranged to move along the guiding surface of the spiral convex portion and can be locked in the state of being inserted into the retaining concave portion is provided to the insertion portion of the second coupling body.

CITATION LIST

Patent Literature

Patent Document 1: Patent JP2013-063258
Patent Document 2: Patent JP2014-023565

SUMMARY OF INVENTION

Problems to be Solved by the Invention

In Patent Document 1, the portion where the concave pin is provided has a circular cylindrical shape while the portion where the convex edge is provided has a circular columnar shape. Four or three pairs of pins and edges that form an engagement structure between the concave portion and the convex portion are provided, and arranged at regular angular intervals along the inner periphery of the circular cylinder and the outer periphery of the circular column. Also in Patent Document 2, the concave portion for insertion of the first coupling body has a cylindrical shape while the insertion portion of the second coupling body has a columnar shape. Three pairs of the spiral convex portions and retaining convex portions that form an engagement structure between the first coupling body and the second coupling body are provided, and arranged at regular angular intervals along the inner periphery of the circular cylinder and the outer periphery of the circular column.

In order to properly make that pairs of engagement members in clasps for accessories, for example, the pairs of the pins and the edges in Patent Document 1 or the pairs of the spiral convex portions and retaining convex portions in Patent Document 2, engaged with each other, it is necessary to adjust the rotational position between one member and the other member of the clasp to a position where the pairs of engagement members are engageable with each other. When a user clasps or unclasps the clasp in a case where three or four pairs of engagement members are provided as in Patent Documents 1 and 2, or more than four pairs of engagement members are provided, it is necessary to uniformly or approximately uniformly apply force to the positions where the pairs of engagement members are present in order to make all of the engagement members properly engaged with each other or properly disengaged from each other. For this reason, the entire outer periphery surfaces of conventional general clasps have a circular symmetrical shape. Clasps having an outer peripheral surface of such a shape are easy to uniformly apply force to from a circumferential direction using fingers, whereby operation necessary for clasping and unclasping such as rotation or pushing in, or pulling is easy to perform. In addition, even without paying a special attention to the angles of the rotation between both the members, the seams of both the members match circumferentially. In Patent Documents 1 and 2, both of the members that make up each clasp have a circular symmetrical shape such as a halved egg, and a bell shape.

However, the clasps are required to have an entire outer shape other than a circular symmetrical shape. For example, the clasps are desired to conform to the bodies of users in the state of wearing the accessories, or to have a flat shape for the purpose of a request in design. In a case where three or more pairs of engagement members described above are provided to clasps having a flat outer shape, it is difficult for a user to apply, when clasping or unclasping the accessory, force to the engagement members with fingers so as to bring the engagement members into engagement states and disengagement states at a time. In particular, when users operate the clasps behind their bodies as in the case of clasping a necklace, performing the above-described movement is especially difficult.

If three or more pairs of engagement members are provided to the inside of the clasps having a flat outer shape, the seams of the right and left clasps are displaced from each other in the rotational direction depending on the rotation angles of the right and left clasps when all of the engagement members are engaged with each other, which affects wearing feeling or appearance of the clasps. For example, when three pairs of engagement members are provided to the inside of clasps having a flat outer shape at regular angular intervals, there is only one rotation angle at which the seams match to provide an integrated flat outer shape to the right and left clasps in the state of being clasped to each other. In a state where the clasps are displaced 120 degrees in a right or left direction from the rotation angles, the seams do not match properly to cause a stepwise displacement at the seams while all of the engagement members can be engaged with each other at least.

In view of these circumstances, it is difficult to satisfy both of operational convenience and freedom in design of the outer shape in the clasps including the conventional engagement members disclosed in Patent Documents 1 and 2.

The present invention has been made in view of the above circumstances and an object to overcome the above problems and to provide a clasp that is capable of satisfying both of operational convenience and freedom in design when provided to an accessory or the like.

Means for Solving the Problem

To achieve the objects and in accordance with the purpose of the present invention, a clasp according to the first aspect of the present invention includes a male member that includes an insertion portion consisting of a columnar body, and a female member that includes a housing portion having a cylindrical shape and having an opening at one end, the housing portion being arranged to house the insertion portion when the insertion portion is inserted thereinto in an axial direction. The insertion portion and the housing portion each include attraction members arranged to attract the insertion portion into the housing portion by magnetic attraction force. The male member includes a male engagement body on an outer peripheral surface of the insertion portion. The female member includes a female engagement body on an inner peripheral surface of the housing portion. The male engagement body includes a male longitudinal portion and a male retaining portion that are of a monolithic construction. The female engagement body includes a female longitudinal portion and a female retaining portion that are of a monolithic construction. The male engagement body has one of an edge structure protruding from the outer peripheral surface of the insertion portion and a notch structure recessed from the outer peripheral surface of the insertion portion, and the male longitudinal portion has a size in a longitudinal direction along an axis of the insertion portion that is larger than one of a protruding height of the edge structure and a recessed depth of the notch structure. The female engagement body has one of an edge structure protruding from the inner peripheral surface of the housing portion and a notch structure recessed from the inner peripheral surface of the housing portion, and the female longitudinal portion has a size in a longitudinal direction along an axis of the housing portion that is larger than one of a protruding height of the edge structure and a recessed depth of the notch structure. The male retaining portion and the female retaining portion are capable of preventing, by being locked to each other, the insertion portion from getting out of the housing portion in the axial direction when the insertion portion and the housing portion are in a specified placement where the insertion portion is inserted into the housing portion at a predetermined rotation angle up to a predetermined depth. The male engagement body and the female engagement body are engageable with each other at a plurality of positions along the longitudinal directions of the male engagement body and the female engagement body in the specified placement. The clasp further includes at least one of a male guiding portion that is provided to the male engagement body, the male guiding portion and the male engagement body being of a monolithic construction, and a female guiding portion that is provided to the female engagement body, the female guiding portion and the female engagement body being of a monolithic construction. The male guiding portion is formed as an end edge of the male engagement body that is inclined with respect to the male longitudinal portion, and is arranged to guide the female engagement body when the female engagement body is brought into contact with the male guiding portion to a position corresponding to the specified placement in the presence of the magnetic attraction force by the attraction members. The female guiding portion is formed as an end edge of the female engagement body that is inclined with respect to the female longitudinal portion, and is arranged to guide the male engagement body when the male engagement body is brought into contact with the female guiding portion to a position corresponding to the specified placement in the presence of the magnetic attraction force by the attraction members.

It is preferable that the male engagement body should be provided to the insertion portion over an entire area of the insertion portion in the axial direction, and the female engagement body should be provided to the housing portion over an entire area of the housing portion in the axial direction.

It is preferable that the male engagement body and the female engagement body should have the edge structures, and the clasp should include only the female guiding portion among the male guiding portion and the female guiding portion.

It is preferable that the clasp should include two pairs of the male engagement bodies and the female engagement bodies, the pairs being disposed in positions opposed to each other with respect to central axes of the insertion portion and the housing portion.

In this case, it is preferable that the male member should include a male base portion supporting the insertion portion, the insertion portion being erected from an end face of the male base portion. It is preferable that the female member should include a female base portion surrounding the housing portion, the housing portion recessed from an end face of the female base portion. It is preferable that the end faces of the male base portion and the female base portion should have a same outer shape other than a round shape, the same outer shape being point-symmetrical with respect to the central axes of the insertion portion and the housing portion, and should be arranged to be in contact with each other over their entire surfaces in the specified placement.

A clasp according to the second aspect of the present invention includes a male member that includes an insertion portion consisting of a columnar body and a male base portion supporting the insertion portion, and a female member that includes a housing portion and a female base portion surrounding the housing portion, the housing portion having a cylindrical shape and containing an opening at one end, the housing portion being arranged to house the columnar body when the columnar body is inserted thereinto in an axial direction. The insertion portion and the housing portion each include attraction members arranged to attract the insertion portion into the housing portion by magnetic attraction force. The male member includes two male engagement bodies in positions opposed to each other with respect to a central axis of the insertion portion on an outer peripheral surface of the insertion portion. The female member includes two female engagement bodies in positions opposed to each other with respect to a central axis of the housing portion on an inner peripheral surface of the housing portion. One of the male engagement bodies and the female engagement bodies are protruding engagement bodies that are one of pins and protrusions erected from one of the outer peripheral surface of the insertion portion and the inner peripheral surface of the housing portion while the other one of the male engagement bodies and the female engagement bodies includes longitudinal engagement bodies that each include longitudinal portions, retaining portions, and guiding portions that are of a monolithic construction, and are mounted on a mounting surface that is selected from the outer peripheral surface of the insertion portion and the inner peripheral surface of the housing portion. The longitudinal engagement bodies each have one of edge structures that protrude from the mounting surface and notch structures that are recessed from the mounting surface, and the longitudinal portions has a size in longitudinal directions along an axis of one of the insertion portion and the housing portion that is larger than one of a protruding height of the edge structures and a recessed depth of the notch structures. The protruding engagement bodies and the retaining portions are capable of preventing, by being locked to each other, the insertion portion from getting out of the housing portion in the axial direction when the insertion portion and the housing portion are in a specified placement where the insertion portion is inserted into the housing portion at a predetermined rotation angle up to a predetermined depth. The guiding portions each are end edges of the longitudinal engagement bodies that are inclined with respect to the longitudinal portions, and are arranged to guide the protruding engagement bodies that are brought into contact with the guiding portions to positions corresponding to the specified placement in the presence of the magnetic attraction force by the attraction members. The end faces of the male base portion and the female base portion have a same outer shape other than a round shape, the same outer shape being point-symmetrical with respect to the central axes of the insertion portion and the housing portion, and are arranged to be in contact with each other over their entire surfaces in the specified placement.

It is preferable that the longitudinal engagement bodies are provided to one of the insertion portion and the housing portion over an entire area thereof in the axial direction.

A clasp according to the third aspect of the present invention includes a male member that includes an insertion portion consisting of a columnar body, and a female member that includes a housing portion having a cylindrical shape and having an opening at one end, the housing portion being arranged to house the columnar body when the columnar body is inserted thereinto in an axial direction. The insertion portion and the housing portion each include attraction members arranged to attract the insertion portion into the housing portion by magnetic attraction force. The male member includes a male engagement body on an outer peripheral surface of the insertion portion. The female member includes a female engagement body on an inner peripheral surface of the housing portion. One of the male engagement body and the female engagement body is a protruding engagement body that is one of a pin and a protrusion erected from one of the outer peripheral surface of the insertion portion and the inner peripheral surface of the housing portion while the other one of the male engagement body and the female engagement body is a combination of a longitudinal engagement body and a retaining portion, the longitudinal engagement body including a guiding portion mounted on a mounting surface that is selected from the outer peripheral surface of the insertion portion and the inner peripheral surface of the housing portion. The longitudinal engagement body has one of an edge structure protruding from the mounting surface and a notch structure recessed from the mounting surface, and the longitudinal engagement body has a size in a longitudinal direction along an axis of one of the insertion portion and the housing portion that is larger than one of a protruding height of the edge structure and a recessed depth of the notch structure. The protruding engagement body and the retaining portion are capable of preventing, by being locked to each other, the insertion portion from getting out of the housing portion in the axial direction when the insertion portion and the housing portion are in a specified placement where the insertion portion is inserted into the housing portion at a predetermined rotation angle up to a predetermined depth. The guiding portion is formed as an end edge of the longitudinal engagement body that is inclined with respect to the axis of one of the insertion portion and the housing portion, and is arranged to guide the protruding engagement body when the protruding engagement body is brought into contact with the guiding portion to a position corresponding to the specified placement from both directions of a clockwise direction and a counterclockwise direction with respect to the axis of one of the insertion portion and the housing portion in the presence of the magnetic attraction force by the attraction members.

It is preferable that the male engagement body should be the protruding engagement body while the female engagement body should be the combination of the longitudinal engagement body including the edge structure, and the retaining portion.

It is preferable that the clasp should further include a stabilizing portion continuously provided to the guiding portion, the stabilizing portion includes a concave structure arranged to house the protruding engagement body in the specified placement.

It is preferable that the longitudinal engagement body should be provided to one of the insertion portion and the housing portion over an entire area thereof in the axial direction.

It is preferable that the clasp should include two pairs of the male engagement bodies and the female engagement bodies, the pairs being disposed in positions opposed to each other with respect to the central axes of the insertion portion and the housing portion.

In this case, it is preferable that the male member should include a male base portion supporting the insertion portion, the insertion portion being erected from an end face of the male base portion, that the female member should include a female base portion surrounding the housing portion, the housing portion recessed from an end face of the female base portion, and that the end faces of the male base portion and the female base portion should have a same outer shape other than a round shape, the same outer shape being point-symmetrical with respect to the central axes of the insertion portion and the housing portion, and are arranged to be in contact with each other over their entire surfaces in the specified placement.

Advantageous Effects of Invention

In the clasp according to the first aspect of the present invention, the male engagement body and the female engagement body that are engageable with each other and have a long shape in the longitudinal directions along the axial directions of the columnar insertion portion and the cylindrical housing portion are arranged to be engaged with each other at a plurality of positions along the longitudinal directions of the male engagement body and the female engagement body. Thus, a strong engagement structure can be obtained between the male engagement body and the female engagement body, which can consequently reduce the number of the pair of the male engagement body and the female engagement body to two or less pairs. This allows the clasp to be clasped or unclasped with high operability, whereby the engagement members can be brought into engagement states and disengagement states even when the clasp has the outer shape that is less symmetrical than a circular symmetrical shape. Thus, the clasp capable of satisfying both of design diversity and operational convenience can be obtained.

In addition, since the male engagement body and the female engagement body have a long shape along the axial directions of the insertion portion and the housing portion, clothes, hair, or the like are prevented from getting caught in the engagement bodies even without providing a tube or the like that covers the engagement bodies. Further, the engagement bodies having a long shape along the axial directions have a more robust structure than engagement bodies having a structure protruding in a height direction like a pin or a protrusion, whereby the thickness of a metal material of which the engagement bodies are made can be reduced. As a result, the clasps can be easily reduced in size, and more diversified in design while also being easily produced in quantity.

In addition, in the clasp according to the first aspect of the present invention, the locking structure between the male retaining portion and the female retaining portion can prevent the insertion portion from getting out of the housing portion in the specified placement where the insertion portion is inserted into the housing portion. Thus, even when force to pull away the mutually-connected male member and female member from each other is applied without any discretion, both of the members are not easily unclasped from each other. In addition, since at least one of the male engagement body and the female engagement body includes the guiding portion arranged to guide the other engagement body to a position corresponding to the specified placement with cooperation of the magnetic attraction force, the specified placement can be achieved semi-automatically only by bringing a portion of the other engagement body into contact with the guiding portion when clasping the male member and the female member. In addition, only pulling away the male member and the female member from each other while rotating the space between them in one direction in a twisting manner can unclasp the male member and the female member. Thus, the operational convenience of the clasp is enhanced by the retaining portion and the guiding portion.

When the male engagement body is provided to the insertion portion over the entire area of the insertion portion in the axial direction while the female engagement body is provided to the housing portion over the entire area of the housing portion in the axial direction, the engagement structure between the male engagement body and the female engagement body can be formed in a wide area along the axial directions of the insertion portion and the housing portion. As a result, the engagement between the both can be easily made particularly strong. In addition, clothes, hair, or the like can be prevented from getting caught in the end edges in the longitudinal directions of both of the engagement bodies.

In addition, when the male engagement body and the female engagement body have an edge structures, and the clasp includes only the female guiding portion among the male guiding portion and the female guiding portion, the male engagement body and the female engagement body are more easily provided on the outer peripheral surface of the insertion portion and the inner peripheral surface of the housing portion by each having the edge structures than a male engagement body and a female engagement body each having notch structures. In addition, since the guiding portion is on the female member's side, the insertion portion can be easily guided to the specified placement when the insertion portion on the male member's side is inserted into the housing portion on the female member's side. In addition, since no male guiding portion is provided to the male engagement body, the outer peripheral portion of the insertion portion that is more visible than the inner peripheral portion of the housing portion can have simple appearance.

When the clasp includes two pairs of the male engagement bodies and the female engagement bodies, the pairs being disposed in positions opposed to each other with respect to central axes of the insertion portion and the housing portion, the base portions of the male member and the female member can be designed so as to have a variety of outer shapes without impairing the operational convenience in clasping and unclasping both the members as long as two types of combination of engagement by the two male engagement bodies and the two female engagement bodies are possible, to be specific, as long as the male member and the female member can be engaged with each other both at one rotation angle and at another rotation angle that is an angle rotated 180 degrees from the one rotation angle. Thus, the clasp can have the high degree of freedom in design.

In this case, when the male member includes the male base portion supporting the insertion portion, the insertion portion being erected from the end face of the male base portion, and the female member includes the female base portion surrounding the housing portion, the housing portion recessed from the end face of the female base portion, and the end faces of the male base portion and the female base portion have the same outer shape other than a round shape, the same outer shape being point-symmetrical with respect to the central axes of the insertion portion and the housing portion, and are arranged to be in contact arranged to be in contact with each other over their entire surfaces in the specified placement, the end faces of the male base portion and the female base portion coincide precisely with each other without any displacement or step. In addition, the state can be achieved both at the one rotation angle and at the other rotation angle that is an angle rotated 180 degrees from the one rotation angle. For example, when the male base portion and the female base portion have a flat shape, the state where the end faces of both the members coincide precisely with each other can be obtained in both of a case where the flat face of the female base portion is placed face up to the flat face of the male base portion and a case where the flat face of the female base portion is placed face down to the flat face of the male base portion. Thus, the clasp capable of satisfying both of operational convenience and freedom in design at higher levels can be obtained.

In the clasp according to the second aspect of the present invention, since the two pairs of the protruding engagement bodies and the longitudinal engagement bodies are provided in positions opposed to each other with respect to the central axes of the insertion portion and the housing portion, the base portions of the male member and the female member can be designed so as to have a variety of outer shapes without impairing the operational convenience in clasping and unclasping both the members as long as two types of combination of engagement by the two protruding engagement bodies and the two longitudinal engagement bodies are possible, to be specific, as long as the male member and the female member can be engaged with each other both at one rotation angle and at the other rotation angle that is an angle rotated 180 degrees from the one rotation angle. Thus, the clasp can have the high degree of freedom in design.

In addition, in the clasp according to the second aspect of the present invention, the locking structure between the protruding engagement bodies and the retaining portions of the longitudinal engagement bodies can prevent the insertion portion from getting out of the housing portion in the specified placement where the insertion portion is inserted into the housing portion. Thus, even when force to pull away the mutually-connected male member and female member from each other is applied without any discretion, both of the members are not easily unclasped from each other. In addition, since the longitudinal engagement bodies include the guiding portions arranged to guide the protruding engagement bodies to the positions corresponding to the specified placement with cooperation of the magnetic attraction force, the specified placement can be achieved semi-automatically only by bringing the protruding engagement bodies into contact with the guiding portions when clasping the male member and the female member. In addition, only pulling away the male member and the female member from each other while rotating the space between them in one direction in a twisting manner can unclasp the male member and the female member. Thus, the operational convenience of the clasp is enhanced by providing the clasp with the longitudinal engagement bodies including the retaining portions and the guiding portions, and the protruding engagement bodies in pairs.

When the longitudinal engagement bodies are provided to the insertion portion or the housing portion over the entire area thereof in the axial direction, the insertion portion can be inserted deep into the housing portion, whereby the clasping between the male member and the female member can be made stronger. In addition, clothes, hair, or the like can be prevented from getting caught in the end edges in the longitudinal directions of the longitudinal engagement bodies.

In the clasp according to the third aspect of the present invention, the longitudinal engagement body provided on one of the outer peripheral surface of the insertion portion and the inner peripheral surface of the housing portion includes the guiding portion arranged to guide the mating protruding engagement body to a position corresponding to the specified placement from both directions of a clockwise direction and a counterclockwise direction with cooperation of the magnetic attraction force. Thus, force to make the protruding engagement body stay in the specified placement such that the protruding engagement body moves in neither of a clockwise direction or a counterclockwise direction is applied in the specified placement where the insertion portion is inserted into the housing portion. Thus, an engagement structure between the longitudinal engagement body and the protruding engagement body can be maintained strong, which can consequently reduce the number of the pair of the male engagement body and the female engagement body to two or less pairs. This allows the clasp to be clasped or unclasped with high operability, whereby the engagement members can be engaged with each other or disengaged from each other even when the clasp has the outer shape that is less symmetrical than a circular symmetrical shape. Thus, the clasp capable of satisfying both of design diversity and operational convenience can be obtained.

In addition, in the clasp according to the third aspect of the present invention, the locking structure between the protruding engagement body and the retaining portion can prevent the insertion portion from getting out of the housing portion in the specified placement where the insertion portion is inserted into the housing portion. Thus, even when force to pull away the mutually-connected male member and female member from each other is applied without any discretion, both of the members are not easily unclasped from each other. In addition, the configuration of the guiding portion can achieve the specified placement semi-automatically only by bringing the protruding engagement body into contact with the guiding portion when clasping the male member and the female member. In particular, since the guiding portion is capable of guiding the protruding engagement body from both directions of the clockwise direction and the counterclockwise direction, the protruding engagement body can be guided in accordance with different contact positions and contact states when being brought into contact with the guiding portion. The male engagement body and the female engagement body can be unclasped by twisting the space between the male engagement body and the female engagement body in either direction of the clockwise direction or the counterclockwise direction. Thus, by using the retaining portion and the longitudinal engagement including the guiding portion in combination with the protruding engagement body, the guiding portion can be further guided from both of the right and left sides, whereby the operability of the clasp is particularly improved.

In this case, when the male engagement body is the protruding engagement body while the female engagement body is the combination of the longitudinal engagement body having the edge structure, and the retaining portion, the guiding portion is on the female member's side, whereby the insertion portion can be easily guided to the specified placement when the insertion portion on the male member's side is inserted into the housing portion on the female member's side. In addition, since the protruding engagement body smaller in size than the longitudinal engagement body is provided to the insertion portion, the outer peripheral portion of the insertion portion that is more visible than the inner peripheral portion of the housing portion can have simpler appearance. In addition, having the edge structure, the longitudinal engagement body can be provided more easily on the inner peripheral surface of the housing portion than a longitudinal engagement body including a notch structure.

In addition, when the stabilizing portion is continuously provided to the guiding portion, and the stabilizing portion has a concave structure arranged to house the protruding engagement body in the specified placement, the protruding engagement body is housed inside the concave structure of the stabilizing portion, whereby the protruding engagement body can be prevented from moving in both directions of the clockwise direction and the counterclockwise direction, and is thus made to easily stay in the specified placement. As a result, the engagement structure between the longitudinal engagement body and the protruding engagement body can be particularly maintained strong.

When the longitudinal engagement body is provided to the insertion portion or the housing portion over the entire area thereof in the axial direction, the insertion portion can be inserted deep into the housing portion, whereby the clasping between the male member and the female member can be made stronger. In addition, clothes, hair, or the like can be prevented from getting caught in the end edge in the longitudinal direction of the longitudinal engagement body.

When the clasp includes two pairs of the male engagement bodies and the female engagement bodies, the pair being disposed in positions opposed to each other with respect to the central axes of the insertion portion and the housing portion, the base portions of the male member and the female member can be designed so as to have a variety of outer shapes without impairing the operational convenience in clasping and unclasping both the members as long as two types of combination of engagement by the two longitudinal engagement bodies and the two protruding engagement bodies are possible, to be specific, as long as the longitudinal engagement bodies and the protruding engagement bodies can be engaged with each other both at one rotation angle and at another rotation angle that is an angle rotated 180 degrees from the one rotation angle. Thus, the clasp can have the high degree of freedom in design.

In this case, when the male member includes the male base portion supporting the insertion portion, the insertion portion being erected from the end face of the male base portion, and the female member includes the female base portion surrounding the housing portion, the housing portion recessed from the end face of the female base portion, and the end faces of the male base portion and the female base portion have the same outer shape other than a round shape, the same outer shape being point-symmetrical with respect to the central axes of the insertion portion and the housing portion, the end faces of the male base portion and the female base portion coincide precisely with each other without any displacement or step. In addition, the state can be achieved both at the one rotation angle and at the other rotation angle that is an angle rotated 180 degrees from the one rotation angle. For example, when the male base portion and the female base portion have a flat shape, the state where the end faces of both the members coincide precisely with each other can be obtained in both of a case where the flat face of the female base portion is placed face up to the flat face of the male base portion and a case where the flat face of the female base portion is placed face down to the flat face of the male base portion. Thus, the clasp capable of satisfying both of operational convenience and freedom in design at higher levels can be obtained.

BRIEF DESCRIPTION OF DRAWINGS

FIG. 7A is a development view in which retaining portions protrude in non-right angle directions, FIG. 7B is a development view in which retaining portions have a round shape, and FIG. 7C is a development view in which the stabilizing portions are provided.

MODE FOR CARRYING OUT THE INVENTION

Figure 1:
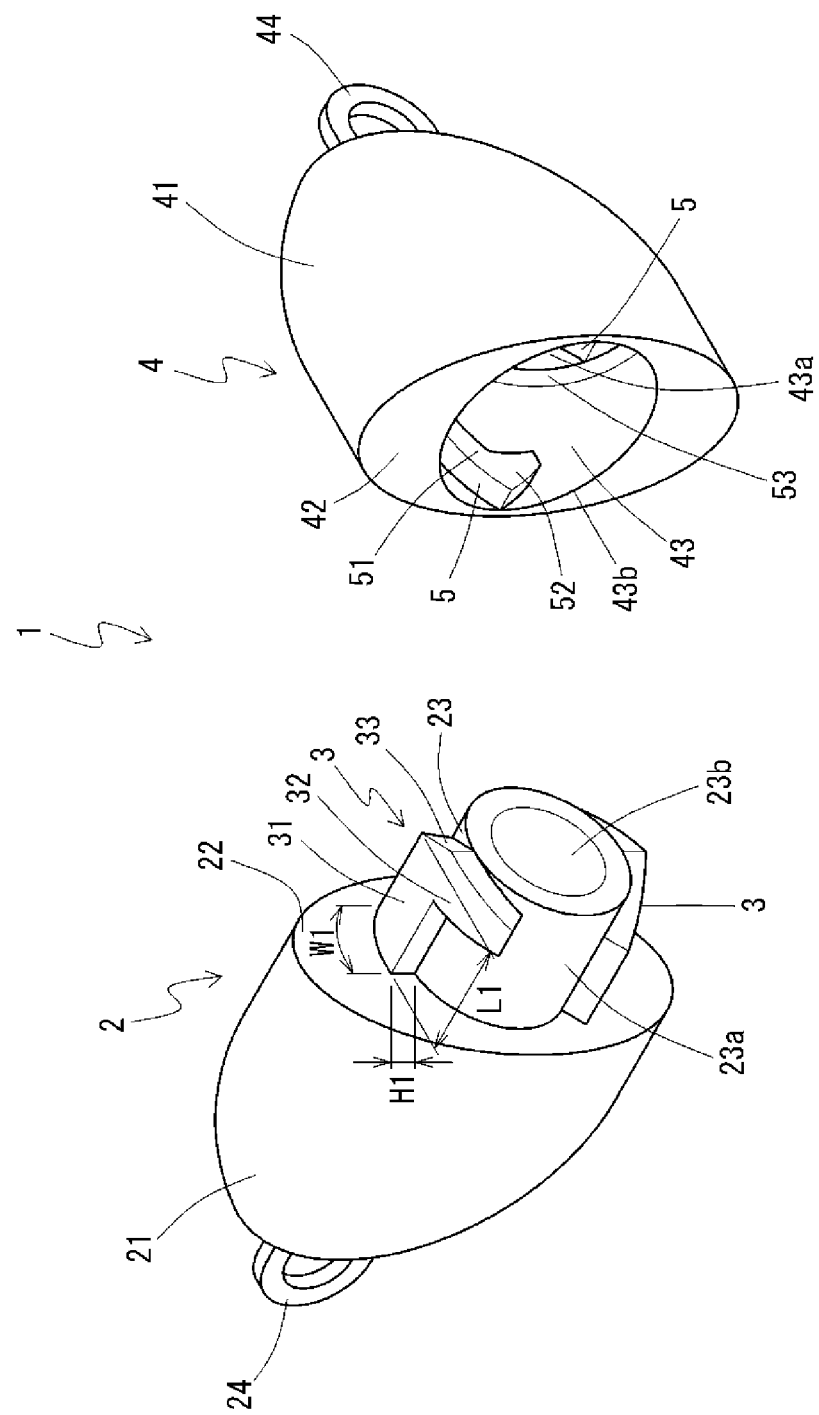
FIG. 1 is a perspective view of a clasp according to the first embodiment of the present invention, showing the configuration of the clasp.

Hereinafter, detailed descriptions of a clasp according to aspects of the present invention will be provided with reference to the drawings. The clasps according to aspects of the present invention are preferably used provided at both ends of accessories such as a necklace, a bracelet, an anklet, and a key holder that are used in a ring shape changed from a liner shape. In addition to being used in the accessories, the clasps according to aspects of the present are preferably used as coupling parts for clasping various kinds of items. Examples of subjects to which the clasps are applied other than accessories include a bag, a belt, and a seat belt.

[First Aspect]

A description of the clasp according to the first aspect of the present invention will be provided. A clasp 1 according to the first aspect of the present invention is illustrated in FIG. 1 to FIG. 6.

First, the entire configuration of the clasp 1 will be described with reference mainly to FIGS. 1 and 2. The clasp 1 includes a pair of a male member 2 and a female member 4. Clasping of the male member 2 and the female member 4 from the state of being separate from each other and unclasping of the male member 2 and the female member 4 from the state of being clasped to each other can be performed in a reversible fashion.

The material of which the male member 2 and the female member 4 are made is not particularly specified; however, a metal material is preferred in terms of strength, workability, and harmony with the entire accessory. In particular, when used in an accessory, the male member 2 and the female member 4 are preferably made of noble metals such as gold, silver, platinum, and alloys mainly made from them.

The male member 2 includes a male base portion 21, and an insertion portion 23 supported by the male base portion 21, the male base portion 21 and the insertion portion 23 being of a monolithic construction. The female member 4 includes a female base portion 41, and a housing portion 43 surrounded by the female base portion 41, the female base portion 41 and the housing portion 43 being of a monolithic construction.

The male base portion 21 and the female base portion 41 are portions that are touched to be operated by a user with his/her fingers when the user clasps the male member 2 and the female member 4 to each other and unclasps the male member 2 and the female member 4 from each other, and are portions that are visible from the outside in a state where the male member 2 and the female member 4 are clasped to each other. The end face 22 of the male base portion 21 and the end face 42 of the female base portion 41 define flat faces, and are brought into contact with each other when the male member 2 and the female member 4 are clasped to each other. The end face 22 of the male base portion 21 and the end face 42 of the female base portion 41 have the same outer shape (outline) as each other in mirror symmetry, and when the male member 2 and the female member 4 are clasped to each other to bring the end face 22 and the end face 42 into contact with each other, the end face 22 and the end face 42 coincide precisely with each other without any displacement or step over their entire surfaces, to be specific, over the entire areas excluding the insertion portion 23 and the housing portion 43 that are inside of the outer rims. In the illustrated aspect, the end faces 22 and 42 of the male base portion 21 and the female base portion 41 have the outer shape of an ellipse. Attaching portions 24 and 44 having a through-hole that are usable for connection with a main body of a necklace or the like are provided to the male base portion 21 and the female base portion 41 at their end portions opposite to the end faces 22 and 42.

The insertion portion 23 of the male member 2 consists of a columnar body. In the illustrated aspect, the insertion portion 23 has a circular columnar shape. The insertion portion 23 is erected from the end face 22 of the male base portion 21 while having its central axis at the center of the end face 22 of the male base portion 21.

The housing portion 43 of the female member 4 includes a cylindrical body including an opening 43b at one end. In the illustrated aspect, the housing portion 43 has a circular cylindrical shape, and includes a bottom portion on the other side in the axial direction of the opening portion 43b. The housing portion 43 is provided inside of the end face 42 of the female base portion 41 recessed therefrom. The central axis of the housing portion 43 is at the center of the end face 42. The housing portion 43 has an inner diameter and a depth that are set such that the housing portion 43 can house the entire insertion portion 23 in a state where the insertion portion 23 is inserted into the housing portion 43 along the axial direction.

Figure 2:
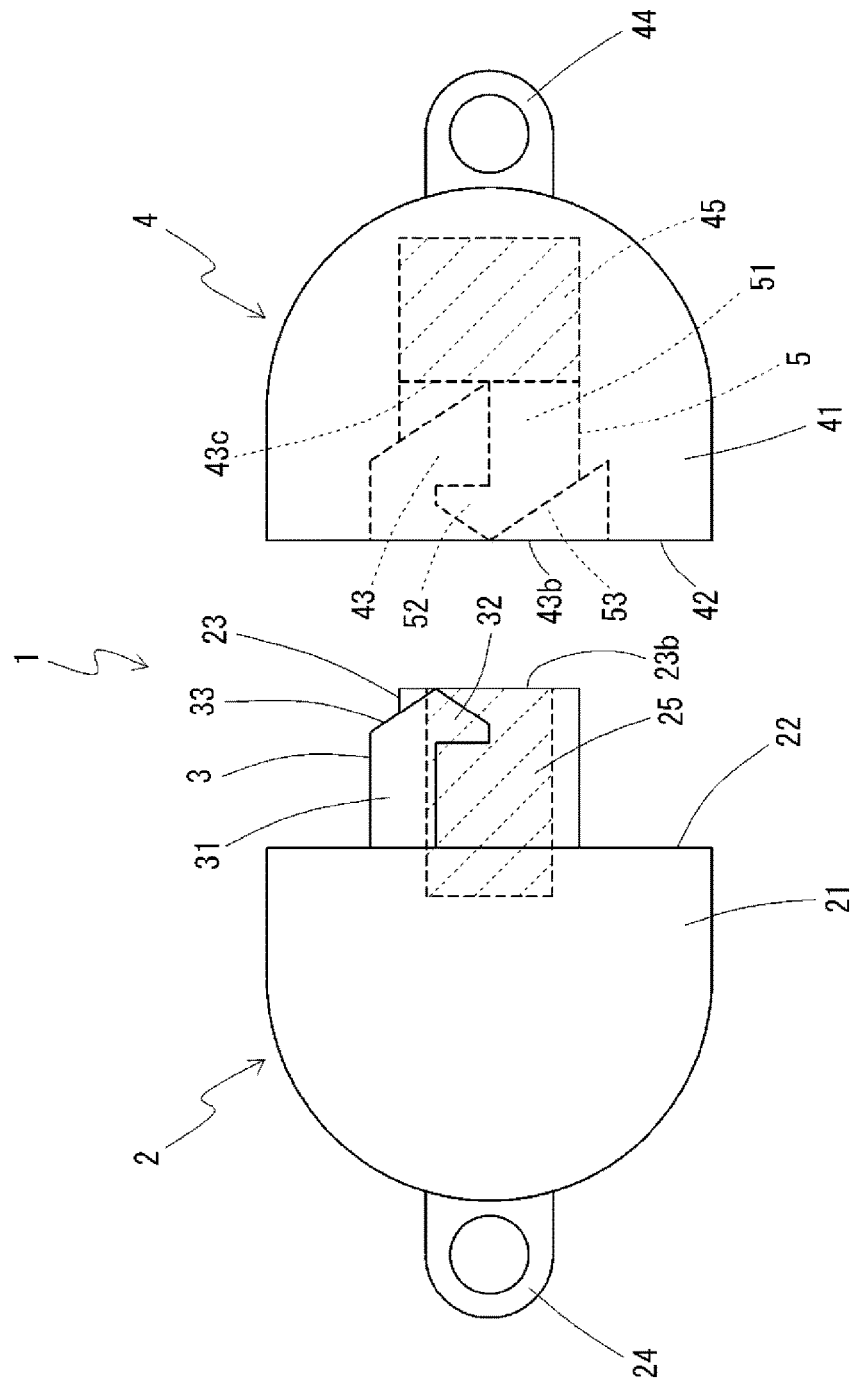
FIG. 2 is a plan view of the clasp according to the first embodiment of the present invention.

In FIG. 1, the end face 22 of the male base portion 21 and the end face 42 of the female base portion 41 define flat faces made of a metal material; however, these metallic faces are not necessarily provided. In this case, the areas surrounded by the outer rims at the end portions of the base portions 21 and 41 define the end faces 22 and 42, and the shapes of the outer rims at the end portions of both the base portions 21 and 41 define the outer shapes of the end faces 22 and 42. It is essential only that the insertion portion 23 should be erected from the male base portion 21 while penetrating the area surrounded by the outer rim, and that the housing portion 43 should be at a position recessed below the area surrounded by the outer rim (a receding position). In addition, in this case, the outer shell of the female base portion 41 may double as the cylindrical housing portion 43 in the female member 4, and in this case, the inner side of the outer shell of the female base portion 41 defines the inner peripheral surface 43a of the housing portion 43.

The insertion portion 23 and the housing portion 43 each include attraction members 25 and 45 arranged to attract the insertion portion 23 into the housing portion 43 by magnetic attraction force. A pair of permanent magnets are preferably used as the attraction members 25 and 45 from the viewpoint that high selective attraction force can be obtained. In another aspect, it is also possible to use a permanent magnet as one of the attraction members 25 and 45 while using a magnetic member such as paramagnetic metal as the other one. As illustrated in FIG. 2, it is preferable to dispose the attraction member 25 inside the columnar insertion portion 23 in the male member 2, and to dispose the attraction member 45 behind a bottom portion 43c of the housing portion 43 in the female member 4 from the viewpoint that magnetic attraction force can be exerted along the axial directions of the insertion portion 23 and the housing portion 43, and the viewpoint of appearance of both the members 2 and 4. Disposition and selection of the polarities of the attraction members 25 and 45 may be made such that a distal end 23b of the insertion portion 23 and the bottom portion 43c of the housing portion 43 are attracted to each other. In addition, disposition and selection of the polarities of the attraction members 25 and 45 may be made in order not only to generate magnetic attraction force along the axial directions to attract the insertion portion 23 into the housing portion 43 but also to guide the rotation between the insertion portion 23 and the housing portion 43 to the rotation angle in a specified placement to be described later.

In the male member 2, a male engagement body 3 is provided on an outer peripheral surface 23a of the insertion portion 23. In the illustrated aspect, two identical male engagement bodies 3 are provided. The two male engagement bodies 3 are disposed in positions opposed to each other with respect to the central axis of the insertion portion 23, to be specific, in positions axisymmetrical with the axis of the insertion portion 23. In this aspect, the two male engagement bodies 3 are disposed in positions corresponding to the minor axial direction of the elliptical end face 22 of the male base portion 21.

In the female member 4, the female engagement body 5 is provided on an inner peripheral surface 43a of the housing portion 43. In the illustrated aspect, two identical female engagement bodies 5 are provided. The two female engagement bodies 5 are disposed in positions opposed to each other with respect to the central axis of the housing portion 43, to be specific, in positions axisymmetrical with the axis of the housing portion 43. In this aspect, the two female engagement bodies 5 are disposed in positions corresponding to the minor axial direction of the elliptical end face 42 of the female base portion 41.

FIGS. 3 to 6 illustrate, in their upper portions, the insertion portion 23 viewed from the outside while the male engagement bodies 3 are developed into a plane along the outer periphery of the insertion portion 23. In addition, FIGS. 3 to 6 illustrate, in their lower portions, the housing portion 43 viewed from the inside while the female engagement bodies 5 are developed into a plane along the inner periphery of the housing portion 43. Next, a detailed description of the shapes of the male engagement bodies 3 and the female engagement bodies 5 will be provided with reference mainly to FIG. 1 and FIG. 3.

Each of the male engagement bodies 3 includes a male longitudinal portion 31 and a male retaining portion 32 that are of a monolithic construction. Each of the male engagement bodies 3 is provided as an edge structure as a whole that protrudes at a predetermined protruding height H1 from the outer peripheral surface 23a of the insertion portion 23.

In the edge structure of each male engagement body 3, the edge structure at the male longitudinal portion 31 has a long shape along the axis of the insertion portion 23. To be specific, the size (length) L1 in the direction along the axis of the insertion portion 23 is larger than the protruding height H1 from the outer peripheral surface 23a of the insertion portion 23. It is preferable that the length L1 should be larger than the size (width) W1 in the direction along the outer periphery of the insertion portion 23, and more preferable that the width W1 should be larger than the protruding height H1. In addition, each male engagement body 3 is, as the entire male engagement body 3 including the male longitudinal portion 31 and the male retaining portion 32, preferably provided to the insertion portion 23 over the entire area in the axial direction.

The male retaining portions 32 each protrude in a pawl shape in direction intersecting with the longitudinal direction from the distal end portions in the longitudinal directions of the male longitudinal portions 31 along the outer periphery of the insertion portion 23. To be specific, the male retaining portions 32 each include protruding edges 32a that protrude outward from the distal end portions of longitudinal end edges 31a, which are one of the end edges of the male longitudinal portions 31 along the axial direction of the insertion portion 23, at a right angle to the longitudinal end edges 31a, to be specific, protrude in a direction along the periphery of the insertion portion 23. In addition, the male retaining portions 32 each include parallel edges 32b that each extend from the protruding edges 32a toward the distal end 23b of the insertion portion 23 so as to be parallel to the axis of the insertion portion 23 and the longitudinal end edges 31a of the male longitudinal portions 31.

In addition, the male retaining portions 32 each include inclined portions 33 on the other sides in the protruding directions of the male retaining portions 32, the inclined portions 33 extending from the distal ends of longitudinal end edges 31b that are the other end edges of the male longitudinal portions 31, and being inclined to the male retaining portions 32 toward the distal end 23b of the insertion portion 23. The inclined portions 33 have an inclination angle that is equal to the inclination angle of the female guiding portions 53 of the female engagement bodies 5 to be described later.

Meanwhile, each of the female engagement bodies 5 includes a female longitudinal portion 51, a female retaining portion 52, and a female guiding portion 53 that are of a monolithic construction. Each of the female engagement bodies 5 is provided as an edge structure as a whole that protrudes at a predetermined protruding height H2 (not illustrated) from the inner peripheral surface 43a of the housing portion 43.

In the edge structure of each female engagement body 5, the edge structure at the female longitudinal portion 51 has a long shape along the axis of the housing portion 43. To be specific, the size (length) L2 in the direction along the axis of the housing portion 43 is larger than the protruding height H2 from the inner peripheral surface 43a of the housing portion 43. It is preferable that the length L2 should be larger than the size (width) W2 in the direction along the inner periphery of the housing portion 43, and more preferable that the width W2 should be larger than the protruding height H2. In addition, each of the female engagement bodies 5 is, as the entire female engagement body 5 including the female longitudinal portion 51, the female retaining portion 52, and the female guiding portion 53, preferably provided to the housing portion 43 over the entire area in the axial direction. It is to be noted that in each of the female engagement bodies 5, the boundaries among the female longitudinal portion 51 and the sections adjacent to the female longitudinal portion 51 are not necessarily clear; however, the female longitudinal portion 51 should define an area having the width W2 that is equal to the width W1 of the male longitudinal portion 31.

Figure 3:
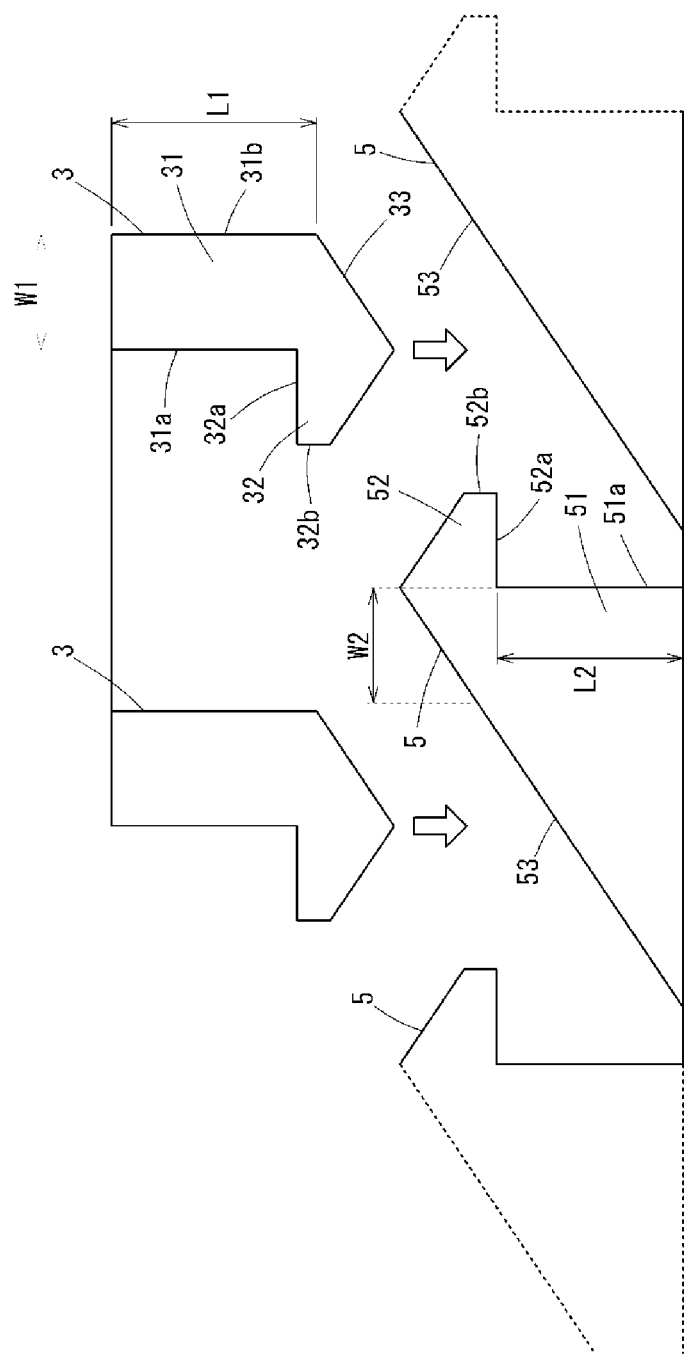
FIG. 3 is a development view of the clasp according to the first embodiment of the present invention, showing pairs of engagement bodies in the state of being attracted to each other by magnetic attraction force, where the development view schematically shows the engagement bodies that are developed along the outer periphery of the insertion portion and the inner periphery of the housing portion, and the sections developed over one round are indicated with broken lines (hereinafter, the same goes for the following development views).
Figure 6:
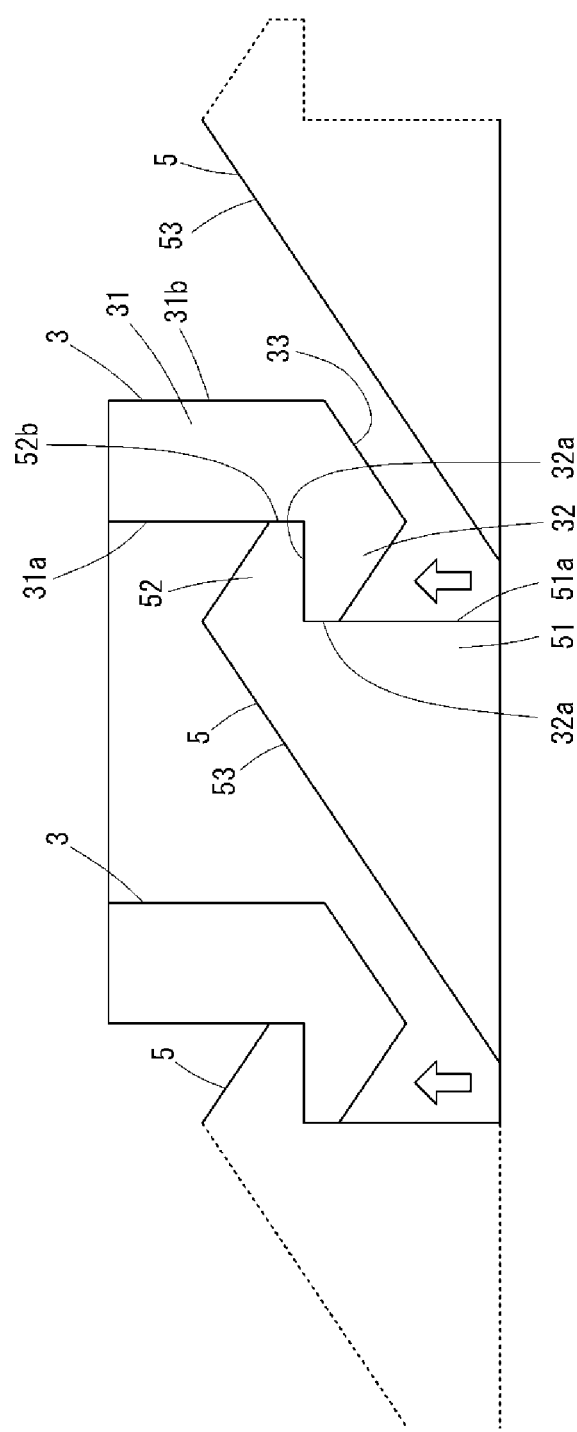
FIG. 6 is a development view of the clasp according to the first embodiment of the present invention, showing the pairs of the engagement bodies in a state where both of the retaining portions are locked to each other when force is applied in an axial direction to the clasp without any discretion.

The female retaining portions 52 each protrude in a pawl shape in a direction intersecting with the longitudinal direction from the distal end portions in the longitudinal directions of the female longitudinal portions 51 along the inner periphery of the housing portion 43. The female retaining portions 52 have the same shape as the male retaining portions 32, and each include protruding edges 52a that protrude in a direction along the periphery of the housing portion 43, and parallel edge 52b that each extend from the protruding edges 52a toward the opening 43b of the housing portion 43 so as to be parallel to the axis of the housing portion 43 and longitudinal end edges 51a of the female longitudinal portions 51. As illustrated in FIG. 3, the female retaining portions 52 are each provided continuously to the female longitudinal portions 51 so as to have a shape and disposition corresponding to the male retaining portions 32 that are turned upside down and inside out, in a state where the distal ends of the male longitudinal portions 31 and the distal ends of the female longitudinal portions 51 are opposed each other. As illustrated in FIG. 6, the male retaining portions 32 and the female retaining portions 52 can be locked to each other at a position where the insertion depth of the insertion portion 23 in the housing portion 43 becomes slightly smaller than the specified placement to be described later in a state where the insertion portion 23 is inserted into the housing portion 43.

The female guiding portions 53 are provided as edges of the female engagement bodies 5 on the sides opposite to the directions in which the female retaining portions 52 protrude from the female longitudinal portions 51. The female guiding portions 53 are provided to the female engagement bodies 5 over the entire areas in the longitudinal directions along the inner peripheral surface 43a of the housing portion 43. The female guiding portions 53 are inclined with respect to the longitudinal directions of the female longitudinal portions 51 that are parallel to the axis of the insertion portion 23, and thus have a helical shape around the central axis of the housing portion 43. The female guiding portions 53 are inclined in directions away from the female longitudinal portions 51 toward the axially rear end portion (toward the bottom portion 43c) of the housing portion 43, and strike the rear ends of the longitudinal end edges 51a of the adjacent female engagement bodies 5 at the axially rear end portion of the housing portion 43.

Now, a description of the movement of the male engagement bodies 3 and the female engagement bodies 5 when the male member 2 and the female member 4 are clasped to each other and unclasped from each other will be provided with reference to FIGS. 3 to 6. In clasping the male member 2 and the female member 4 to each other, the end face 22 of the male base portion 21 and the end face 42 of the female base portion 41 are first opposed to each other from the state where the male member 2 and the female member 4 are apart from each other, and then the male member 2 and the female member 4 are brought close to each other.

Then, the insertion portion 23 is guided to the inside of the housing portion 43 by magnetic attraction force of the attraction members 25 and 45 provided to the insertion portion 23 of the male member 2 and the housing portion 43 of the female member 4, and then the distal end portions of the male engagement bodies 3 (the portions on the sides of the male retaining portions 32) and the distal end portions of the female engagement bodies 5 (the portions on the sides of the female retaining portions 52) come close to each other as illustrated in FIG. 3. While the rotation angle between the insertion portion 23 and the housing portion 43 is set such that the positions in lateral directions (circumferential directions) of both of the distal end portions match approximately with each other in FIG. 3, the rotation angle between the insertion portion 23 and the housing portion 43 is not limited hereto, and may be set arbitrarily.

Figure 4:
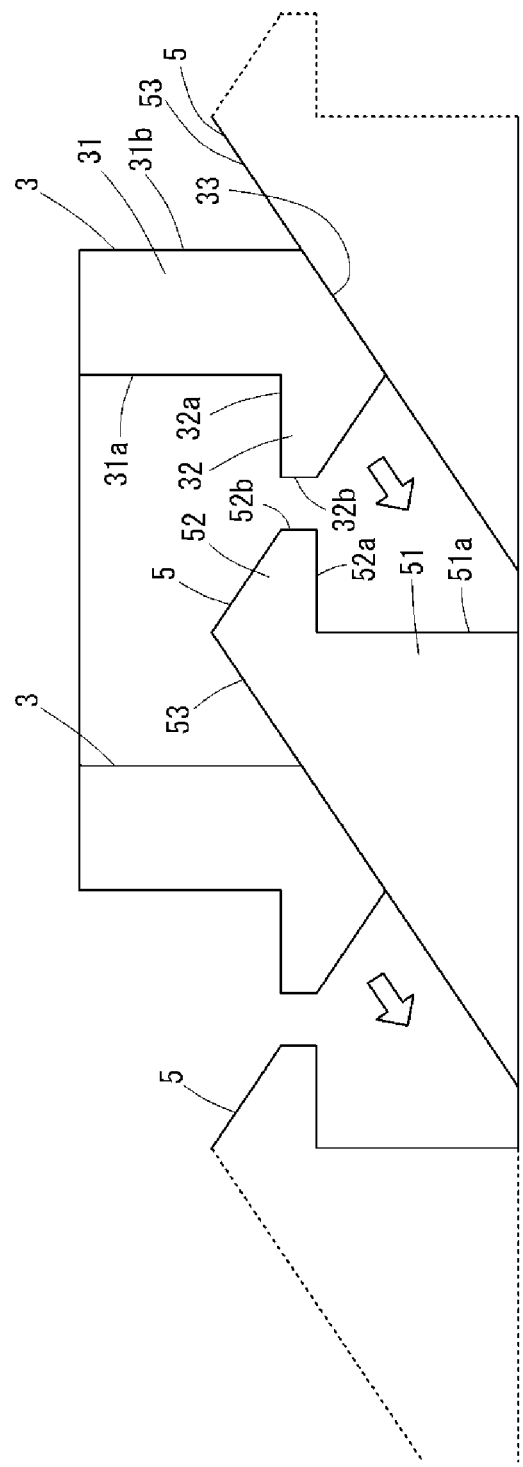
FIG. 4 is a development view of the clasp according to the first embodiment of the present invention, showing the pairs of the engagement bodies in a state where the male engagement bodies move along female guiding portions of the female engagement bodies.

When the insertion portion 23 is guided deeper into the housing portion 43 by magnetic attraction force, the distal ends of the male engagement bodies 3 are brought into contact with the female guiding portions 53 of the female engagement bodies 5 as illustrated in FIG. 4. Since the rotation angle between the insertion portion 23 and the housing portion 43 can be set arbitrarily as described above, the positions where the male engagement bodies 3 are brought into contact with the female guiding portions 53 vary when the rotation angle varies, and thus the contact positions can be set at arbitrary positions on the female guiding portions 53.

Since the inclination angle of the inclined portions 33 of the male engagement bodies 3 is equal to the inclination angle of the female guiding portions 53 of the female engagement bodies 5, when the distal ends of the male engagement bodies 3 are brought into contact with the female guiding portions 53, the inclined portions 33 of the male engagement bodies 3 are brought into the state of being in contact with the female guiding portions 53 along the slopes of the female guiding portions 53 as illustrated in FIG. 4. When magnetic attraction force acts in this state, the male engagement bodies 3 move toward the rear end portions of the female engagement bodies 5 (the portion on the axially rear end's side of the housing portion 43) such that the inclined portions 33 slide down the slopes of the female guiding portions 53 as indicated with the arrows in FIG. 4, and the male engagement bodies 3 are guided to positions corresponding to the specified placement to be described next.

Figure 5:
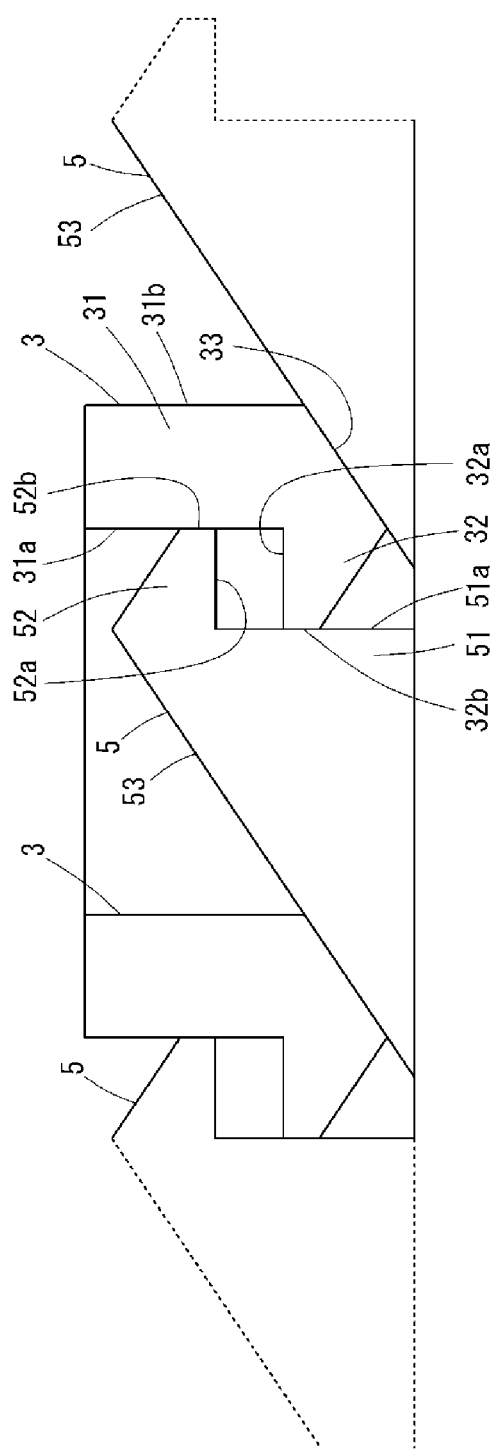
FIG. 5 is a development view of the clasp according to the first embodiment of the present invention, showing the pairs of the engagement bodies in the state of being in the specified placement.

When the male engagement bodies 3 guided by the female guiding portions 53 get close to the rear end portions of the female engagement bodies 5, the parallel edges 32b of the male retaining portions 32 of the male engagement bodies 3 are brought into contact with the longitudinal end edges 51a of the female longitudinal portions 51 of the female engagement bodies 5 as illustrated in FIG. 5, and the contact brings the move of the male engagement bodies 3 to a halt. At this time, the parallel edges 52b of the female retaining portions 52 of the female engagement bodies 5 are brought into contact with the longitudinal end edges 31a of the male longitudinal portions 31 of the male engagement bodies 3, simultaneously. This state where the insertion portion 23 is inserted into the housing portion 43 at a predetermined angle up to a predetermined depth is the specified placement. When the specified placement is formed, clasping between the male member 2 and the female member 4 of the clasp 1 is completed.

In the specified placement, the male engagement bodies 3 and the female engagement bodies 5 are in the state of being in contact to be engaged with each other at a plurality of positions along their longitudinal directions. In the illustrated aspect, there are three engagement positions in the order from the distal end sides in the longitudinal directions of the male engagement bodies 3; (1) the contact positions between the inclined portions 33 of the male engagement bodies 3 and the female guiding portions 53: (2) the contact positions between the parallel edges 32b of the male retaining portions 32 and the longitudinal end edges 51a of the female longitudinal portions 51: and (3) the contact positions between the parallel edges 52b of the female retaining portions 52 and the longitudinal end edges 31a of the male longitudinal portions 31. When the specified placement is formed, the male base portion 21 and the female base portion 41 are in the state of being contact with each other while the end faces 22 and 42 having the same outer shape coincide precisely with each other over their entire surfaces, to be specific, while the entire areas surrounded by the outer rims of the end portions coincide with each other. As described above, the clasping between the male member 2 and the female member 4 in the specified placement is completed semi-automatically with cooperation of the magnetic attraction force by the attraction members 25 and 45 and the guiding of the male engagement bodies 3 by the female guiding portion 53.

It happens that during the use of the clasp 1 in a state where the male member 2 and female member 4 are clasped to each other, force to pull away the male member 2 from the female member 4 to get the insertion portion 23 out of the housing portion 43 is applied along the axes of the insertion portion 23 and the housing portion 43 without any discretion, to be specific, independently of the user's intention. In such a case, the specified placement terminates, and the male engagement bodies 3 are pulled up toward the opening 43b of the housing portion 43, and the male retaining portions 32 move toward the female retaining portions 52 along the longitudinal end edges 51a of the female longitudinal portions 51 as indicated with the arrows in FIG. 6. Then, the protruding edges 32a of the male retaining portions 32 and the protruding edges 52a of the female retaining portions 52, which are equal in length and disposed parallel to each other, are brought into contact with each other. To be specific, the male retaining portions 32 and the female retaining portions 52 are locked to each other. At this time, the female parallel edges 52b keep in contact with the longitudinal end edges 31a of the male longitudinal portions 31 while the male parallel edges 32b keep in contact with the longitudinal end edges 51a of the female longitudinal portions 51. Since locking structures are provided between the male retaining portions 32 and the female retaining portions 52, the insertion portion 23 cannot move further toward the opening 43b of the housing portion 43 even if force to make the insertion portion 23 get out of the housing portion 43 is further applied, which can prevent the insertion portion 23 from getting out of the housing portion 43 along the axial direction. When the applied force is released, the insertion portion 23 is pulled back toward the axially rear end of the housing portion 43, and the male engagement bodies 3 and the female engagement bodies 5 return to the specified placement illustrated in FIG. 5. Thus, the clasping between the male member 2 and the female member 4 can be prevented from being released without any discretion.

Meanwhile, in releasing the clasping between the male member 2 and the female member 4 from the clasping state by the intention of a user, it is essential only to apply force to pull away the male member 2 and the female member 4 from each other while rotating the male member 2 and the female member 4 in a twisting manner. When rotative force is applied so as to displace the male engagement bodies 3 with respect to the female engagement bodies 5 toward the right portion of FIG. 5, the inclined portions 33 of the male engagement bodies 3 climb up the slopes of the female guiding portions 53 of the female engagement bodies 5, and the male parallel edges 32b of the male retaining portions 32 separate from the longitudinal end edges 51a of the female longitudinal portions 51 while the longitudinal end edges 31a of the male longitudinal portions 31 also separate from the parallel edges 52b of the female retaining portions 52. Thus, the engagement between the male engagement bodies 3 and the female engagement bodies 5 in the specified placement is released. Releasing the engagement can make the insertion portion 23 get out of the housing portion 43 only by applying force that is greater than magnetic attraction force exerting between the male member 2 and the female member 4 to the insertion portion 23 and the housing portion 43 in the direction of pulling them away from each other along the axes of the insertion portion 23 and the housing portion 43.

In the aspect described above, both of the male engagement bodies 3 and the female engagement bodies 5 have a long shape along the axes of the insertion portion 23 and the housing portion 43. The male engagement bodies 3 and the female engagement bodies 5 are engaged with each other at the plurality of positions along the longitudinal directions of the male engagement bodies 3 and the female engagement bodies 5 as illustrated in FIG. 5. Since the male engagement bodies 3 and the female engagement bodies 5 are engaged with each other at the plurality of positions along the axis in which the insertion portion 23 is inserted into the housing portion 43, a strong engagement structure can be obtained by one pair of the male engagement body 3 and the female engagement body 5. As a result, sufficiently strong engagement as a clasp 1 for accessories can be achieved even without providing many pairs such as three pairs of the male engagement bodies 3 and the female engagement bodies 5.

In a case where the plurality of pairs of the male engagement bodies 3 and the female engagement bodies 5 are provided along the peripheries of the circular columnar insertion portion 23 and the circular cylindrical housing portion 43, the symmetry of each of the base portions 21 and 41, which are operated by a user, around the central axes needs to be made equal or more than the symmetry of each of the engagement bodies 3 and 5 in terms of disposition in order that the user can apply approximately equal force to each of the engagement bodies 3 and 5 in pairs to perform operation of attaching/detaching (clasping and unclasping of the male member 2 and the female member 4). In particular, the base portions 21 and 41 need to be made circular symmetrical. However, if the number of the pairs of the male engagement bodies 3 and the female engagement bodies 5 can be reduced, the base portions 21 and 41 can be less symmetrical, which allows design diversity, for example, a less-symmetrical shape, while the clasp 1 has its operational convenience maintained. For example, as illustrated in FIG. 1, when two pairs of the male engagement bodies 3 and the female engagement bodies 5 are provided in positions opposed to each other with respect to the central axes of the circular columnar insertion portion 23 and the circular cylindrical housing portion 43, to be specific, in positions axisymmetrical with the central axes, the base portions 21 and 41 of the male member 2 and the female member 4 can be designed so as to have a variety of outer shapes without impairing the operational convenience in clasping and unclasping the male member 2 and the female member 4 as long as two types of combination of engagement by the two male engagement bodies 3 and the two female engagement bodies 5 are possible, to be specific, as long as the male engagement bodies 3 and the female engagement bodies 5 can be engaged with each other both at one rotation angle and at another rotation angle that is an angle rotated 180 degrees from the one rotation angle. For example, the male base portion 21 and the female base portion 41 may have a twice symmetrical outer shape that is not a circular symmetrical shape, to be specific, the shape that coincides when rotated 180 degrees around the central axis. The end faces 22 and 42 of the male base portion 21 and the female base portion 41 can also have a twice symmetrical outer shape, to be specific, the shape that is other than a round shape and is point-symmetrical with respect to the central axes of the insertion portion 23 and the housing portion 43. In addition, the end faces 22 and 42 may have an outer shape that is other than a round shape and is vertically and horizontally symmetrical. In fact, illustrated also in FIG. 1 are the end faces 22 and 42 of the two base portions 21 and 41 that have an outer shape of an ellipse, which is a kind of a twice symmetrical and vertically and horizontally symmetrical shape.

In attaching/detaching the clasp 1 that includes two pairs of the male engagement bodies 3 and the female engagement bodies 5, and the male base portion 21 and the female base portion 41 having a twice symmetrical shape, performing operation of twisting, advancing, and retracting the base portions 21 and 41 while holding the upper and lower portions of the base portions 21 and 41 with fingers in a pinching manner makes it easy to apply force uniformly to the positions where the two pairs of engagement members 3 and 5 are provided, whereby the clasp 1 can be clasped or unclasped with high operability. In particular, the magnetic attraction force between the insertion portion 23 and the housing portion 43, and the effect of guiding the male engagement bodies 3 to the specified placement by the female guiding portions 53 allow the male engagement bodies 3 and the female engagement bodies 5 to be engaged with each other with easy operation, which can aid the operability of the clasp 1. While there can be two types of combination of individual bodies of the male engagement bodies 3 and of the female engagement bodies 5 that are engaged with each other, the two end faces 22 and 42 of the male base portion 21 and the female base portion 41 coincide precisely with each other over their entire surfaces even when the male engagement bodies 3 and the female engagement bodies 5 are engaged in either of the two types of combination as long as the end faces 22 and 42 have a same twice symmetrical outer shape. As a result, it never happens that the rotation angles of the end faces 22 and 42 are displaced between the male base portion 21 and the female base portion 41 to cause stepwise unconformity at the seams of the male member 2 and the female member 4.

Thus, by reducing the number of the pairs of the male engagement bodies 3 and the female engagement bodies 5 to two pairs, the outer shapes of the base portions 21 and 41 are not limited to circular symmetrical shapes such as a circular column shape and a bell shape, and thus the clasp 1 that is superior in design and capable of satisfying operational convenience at the same time can be obtained. In particular, when the base portions 21 and 41 are designed such that the end faces 22 and 42 have a flat shape such as an ellipse as illustrated in FIG. 1, the base portions 21 and 41 each have flat faces; however, the state where the end faces of both the members 21 and 41 coincide precisely with each other can be obtained in both of a case where the flat face of the female base portion 41 is placed face up to the flat face of the male base portion 21 and a case where the flat face of the female base portion 41 is placed face down to the flat face of the male base portion 21. In addition, the clasp 1 including the base portions 21 and 41 having a flat shape can conform well to a user's body when used in an accessory such as a necklace, and an uncomfortable feeling generated by the clasp 1 can be reduced in a state where the user wears the accessory. The clasp 1 can be designed so as to have a small size, and is superior in design from the viewpoint of being in better harmony with design of other portions of the accessory.

Since the male engagement bodies 3 and the female engagement bodies 5 have a long shape along the axes of the insertion portion 23 and the housing portion 43, the effect of enhancing the mechanical strength of the male engagement bodies 3 and the female engagement bodies 5 can be also obtained. If this type of engagement bodies have a thinly protruding shape like a pin or a protrusion, the metal material of which the engagement bodies are made needs to be thick in order to obtain sufficient mechanical strength; however, because of the effect of the shapes of the male engagement bodies 3 and the female engagement bodies 5 having a large size in the longitudinal directions, the male engagement bodies 3 and the female engagement bodies 5 can easily obtain mechanical strength, whereby the thicknesses of the male engagement bodies 3 and the female engagement bodies 5 can be reduced to be small. Also when the clasp 1 is made of a relatively soft noble metal among a variety of metals such as gold, silver, and platinum, the male engagement bodies 3 and the female engagement bodies 5 can be made to have a smaller thickness and can easily secure high mechanical strength. By reducing the thickness of the metal material of which the male engagement bodies 3 and the female engagement bodies 5 are made, the clasp 1 can be reduced in size, and more diversified in design while also being easily produced in quantity. If sufficient mechanical strength can be obtained, the male engagement bodies 3 and the female engagement bodies 5 having an edge structure do not need to be bonded to the outer peripheral surface 23a of the insertion portion 23 and the inner peripheral surface 43a of the insertion portion 43 over the entire areas, and another aspect is possible, in which the male engagement bodies 3 and the female engagement bodies 5 are joined to the peripheral surfaces 23a and 43a at partial portions.

In addition, since the male engagement bodies 3 and the female engagement bodies 5 have a long shape along the axes of the insertion portion 23 and the housing portion 43, clothes, hair, or the like can be more prevented from getting caught in the male engagement bodies 3 and the female engagement bodies 5 compared with a case where the male engagement bodies 3 and the female engagement bodies 5 have a structure protruding sharply like a pin or a protrusion. Even when clothes, hair, or the like could get caught therein, they are not easily damaged.

As long as the male engagement bodies 3 and the female engagement bodies 5 have a long shape along the axes of the insertion portion 23 and the housing portion 43, and are engaged with each other at the plurality of positions along the longitudinal directions of the male engagement bodies 3 and the female engagement bodies 5, the length L1 and the length L2 of the male longitudinal portion 31 and the female longitudinal portion 51 are not limited particularly; however, it is preferable that the male engagement bodies 3 should be provided to the insertion portion 23 over the entire area in the axial direction, and the female engagement bodies 5 should be provided to the housing portion 43 over the entire area in the axial direction as illustrated in FIG. 1. With this configuration, the specified placement is formed in a state where the insertion portion 23 is inserted deep into the housing portion 43, and the plurality of the engagement positions along the longitudinal directions of the engagement bodies 3 and 5 are easily secured, clasping between the male member 2 and the female member 4 can be made strong. In addition, hair or clothes can be highly prevented from getting caught in the clasp 1. This is because since the positions of both the end portions in the longitudinal directions of the engagement bodies 3 and 5 match with the positions of the end portions of the insertion portion 23 and the housing portion 43, there is no abrupt end edge at the end portions in the longitudinal directions of the engagement bodies 3 and 5, and thus hair or clothes do not get caught in such an end edge. In particular, the male engagement bodies 3 provided on the insertion portion 23 have such an effect more profoundly.

While the second aspect of the present invention to be described later is possible, in which male guiding portions are each provided to the male engagement bodies 3 while no female guiding portion 53 is provided to the female engagement bodies 5, the present aspect is preferable, in which the female guiding portions 53 are each provided the female engagement bodies 5 provided on the inner peripheral surface 43a of the housing portion 43, because the insertion portion 23 is more easily attracted into the housing portion 43 with cooperation of the magnetic attraction force when inserting the insertion portion 23 into the housing portion 43. In addition, since the outer peripheral surface 23a of the male engagement bodies 23 of the male engagement body 3 is more visible than the inner peripheral surface 43a of the housing portion 43 of the housing portion 43, providing guiding portions inside of the less-visible housing portion 43 allows the male engagement bodies 23 to have simpler appearance, which can improve the appearance of the clasp 1 in a state where the male member 2 is separate from the female member 4.

(Modified Aspects of the Engagement Bodies)

In the above-described aspect, the male retaining portions 32 and the female retaining portions 52 include the protruding edges 32a and 52a perpendicular to the longitudinal end edges 31a and 51a of the male longitudinal portions 31 and the female longitudinal portions 51, and the parallel edges 32b and 52b parallel to the longitudinal end edges 31a and 51a, and the protruding edges 32a and 52a are respectively square to the parallel edges 32b and 52b. However, the male retaining portions 32 and the female retaining portions 52 may have any shape only if their mutual engagement can prevent the insertion portion 23 from getting out of the housing portion 43 in the specified placement along the axial directions. Modified examples of the shapes of the retaining portions 32 and 52 are illustrated in FIGS. 7A and 7B. In addition, a modified example of the shape of the rear end portions of the female engagement bodies 5 are illustrated in FIG. 7C.

Figure 7:
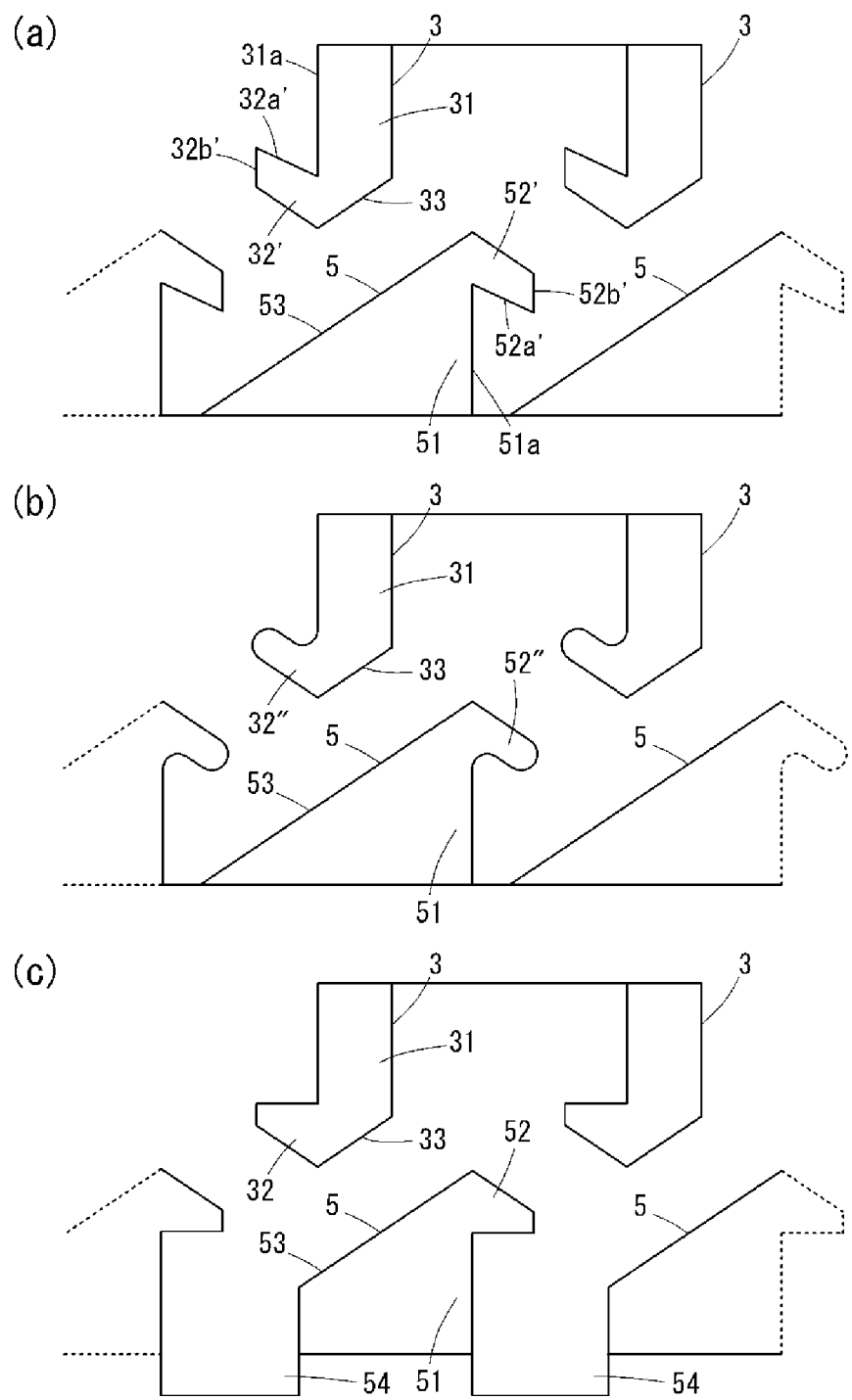
FIG. 7 are development views of modified examples of the clasp according to the first embodiment of the present invention, showing the pairs of the engagement bodies modified in shape, where
Figure 8:
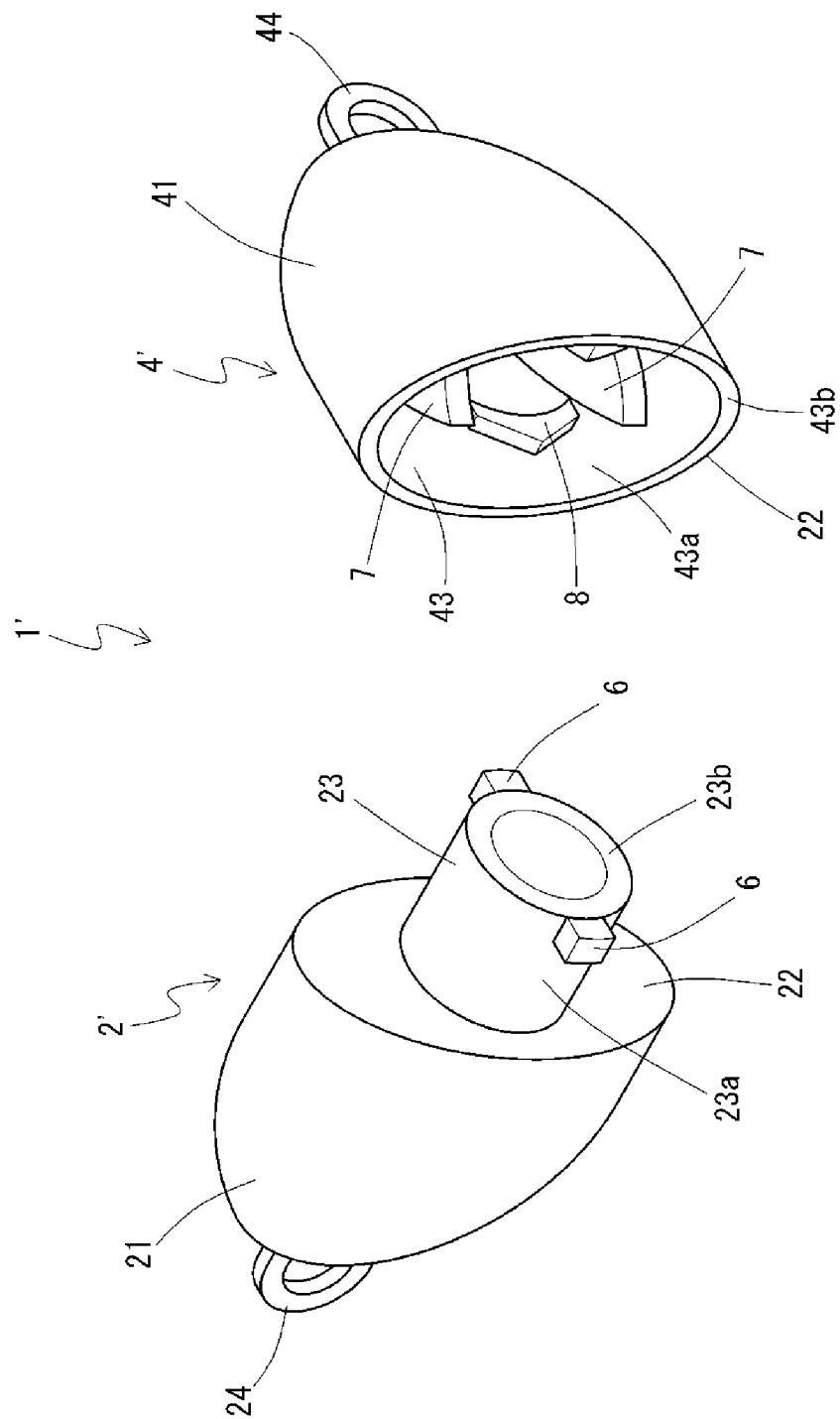
FIG. 8 is a perspective view of a clasp according to the seventh embodiment of the present invention, showing the configuration of the clasp.

In FIG. 7A, protruding edges 32a' and 52a' of retaining portion 32' and 52' protrude at a sharp angle with respect to the longitudinal end edges 31a and 51 of the longitudinal portions 31 and 51 toward the rear end portion. The parallel edges 32b' and 52b' are parallel to the longitudinal end edges 31a and 31b. In this aspect, the male retaining portions 32' and the female retaining portions 52' are locked deeper to each other than the above-described aspect, whereby the insertion portion 23 can be more strongly prevented from getting out of the housing portion 43.

In the aspect illustrated in FIG. 7B, retaining portions 32" and 52" have round corners compared with the aspect illustrated in FIG. 7A. Thus, even if a user touches either of the retaining portions 32" and 52" with his/her finger or the like, the user feels less uncomfortable. In addition, even if hair, clothes, or the like could get caught in either of the retaining portions 32" and 52", they can be less damaged.

In the aspect illustrated in FIG. 7C, stabilizing portions 54 are provided as concave structures at the rear end portions of the female engagement bodies 5. When the male retaining portions 32 are guided by the female guiding portions 53 to reach the rear end portions of the female engagement bodies 5, the male retaining portions 32 get fitted into the stabilizing portions 54. Thus, the stability in keeping the specified placement is enhanced.

(Aspects in which the Engagement Bodies have a Notch Structure)

In the above-described aspects, each of the male engagement bodies 3 is provided as an edge structure protruding from the outer peripheral surface 23a of the insertion portion 23, and each of the female engagement bodies 5 is also provided as an edge structure protruding from the inner peripheral surface 43a of the housing portion 43. However, it is also possible that each of the male engagement bodies 3 is provided as a notch structure recessed from the outer peripheral surface 23a of the insertion portion 23, and/or that each of the female engagement bodies 5 is provided as a notch structure recessed from the inner peripheral surface 43a of the housing portion 43. While the engagement bodies 3 and 5 having an edge structure protrude outward respectively by the predetermined protruding heights H1 and H2 from the outer peripheral surface 23a of the insertion portion 23 and the inner peripheral surface 43a of the housing portion 43, the engagement bodies 3 and 5 having a notch structure are recessed inward respectively by predetermined depths from the outer peripheral surface 23a of the insertion portion 23 and the inner peripheral surface 43a of the housing portion 43 instead. The male engagement bodies 3 and the female engagement bodies 5 having a notch structure are common to the male engagement bodies 3 and the female engagement bodies 5 having an edge structure in shape and disposition, and movement in attaching/detaching and a working effect except that they are different in protruding or recessed. Also in the aspects to be described below, the protruding edge structure can be equivalently replaced with the recessed notch structure. It is to be noted that a recessed structure in terms of a notch structure includes not only a case where a surface of a metal material that makes up the portion of a notch structure are recessed but also a case where a metal material that makes up the portion of a notch structure is removed. The recessed depth of the notch structure in this case is equal to the thickness of the metal material.

In comparison, the edge structure is superior to the notch structure from the viewpoint of easy formation in the outer peripheral surface 23a of the insertion portion 23 and the inner peripheral surface 43a of the housing portion 43, and securing of strength. The notch structure is superior to the edge structure from the viewpoint of reduction in size and simple appearance of the insertion portion 23 and the housing portion 43, in particular from the viewpoint of reduction in size of the insertion portion 23.

[Second Aspect]

A brief description of a clasp according to another aspect of the present invention will be provided. Hereinafter, descriptions of differences from the first aspect will be mainly provided while descriptions of the configuration and the effect similar to those of the clasp 1 according to the first aspect of the above-described invention are omitted.

In the above-described first aspect, the female guiding portions 53 arranged to guide the male engagement bodies 3 to the specified placement are provided to the female engagement bodies 5 while such guiding portions are not provided to the male engagement bodies 3. In contrast, male guiding portions are provided to the male engagement bodies 3 in the second aspect, whereby the female engagement bodies 5 brought into contact with the male guiding portions are guided to positions corresponding to the specified placement in the presence of the magnetic attraction force by the attraction members 25 and 45. The male guiding portions may be, in a similar manner to the female guiding portions 53 in the above-described first aspect, end edges of the male engagement bodies 3 that are inclined with respect to the longitudinal directions of the male longitudinal portions 3, disposed on the sides opposite to the directions in which the male retaining portions 32 protrude from the male longitudinal portions 31 along the outer peripheral surface 23a of the insertion portion 23. Thus, the male guiding portions are provided in a spiral shape around the central axis of the insertion portion 23. In the second aspect, inclined portions similar to the inclined portions 33 of the male engagement bodies 3 in the above-described first aspect are provided on the sides opposite to the directions in which the female retaining portions 52 protrude without providing the female guiding portions 53 to the female engagement bodies 5, and the inclination angle of the inclined portions is made equal to the inclination angle of the male guiding portions of the male engagement bodies 3.

[Third Aspect]

While the guiding portions arranged to guide the mating engagement bodies to positions corresponding to the specified placement are provided to either of the male engagement bodies 3 and the female engagement bodies 5 in the above-described first aspect and second aspect, not only male guiding portions arranged to guide the female engagement bodies 5 are provided to the male engagement bodies 3, but also the female guiding portions 53 arranged to guide the male engagement bodies 3 are provided to the female engagement bodies 5 in the third aspect of the present invention. To be specific, the clasp 1 may include a combination of the female engagement bodies 5 including the female guiding portions 53 of the first aspect and the male engagement bodies 3 including male guiding portions of the second aspect. With this configuration, the inclination of the male guiding portions of the male engagement bodies 3 are brought into contact with the inclination of the female guiding portions 53 of the female engagement bodies 5 in the presence of the magnetic attraction force, and the male engagement bodies 3 and the female engagement bodies 5 slide on each other to be guided to the specified placement. Since the male engagement bodies 3 and the female engagement bodies 5 guide each other to the positions corresponding to the specified placement in this manner, the specified placement can be easily formed.

[Fourth Aspect]

While two pairs of the male engagement bodies 3 and the female engagement bodies 5 are provided in the above-described first to third aspects, the number of the pairs is not limited to two. The number of the pairs may be one pair, or three pairs or more, and the male base portion 21 and the female base portion 41 including the end faces 22 and 42 may be designed so as to have a symmetrical shape corresponding to the number of the pairs. When one pair of the male engagement body 3 and the female engagement body 5 is provided, the male base portion 21 and the female base portion 41 may be designed without considering having a symmetrical shape, whereby the clasp 1 can be more diversified in design.

[Fifth Aspect]

The male engagement bodies 3 provided to the insertion portion 23 and the female engagement bodies 5 provided to the housing portion 43 have an edge structure (or a notch structure) that is long in the axial directions of the insertion portion 23 and the housing portion 43 in the above-described first to fourth aspects. In contrast, in the fifth aspect of the present invention, protruding engagement bodies are provided as the male engagement bodies 3, the protruding engagement bodies consisting of pins or protrusions erected from the outer peripheral surface 23a of the insertion portion 23. The pins or protrusions have a protruding height that is equal to or greater than at least one of the length along the axis of the insertion portion 23 or the width along the periphery of the insertion portion 23. Longitudinal engagement bodies are provided as the female engagement bodies 5, each of the longitudinal engagement bodies including a longitudinal portion 51, a retaining portion 52, and a guiding portion 53 that are of a monolithic construction, and is a longitudinal engagement body having an edge structure protruding from a mounting surface (or a notch structure recessed from a mounting surface) that is the outer peripheral surface 23a of the insertion portion 23, similarly to the female engagement bodies 5 in the above-described first aspect.

When the insertion portion 23 is inserted into the housing portion 43, and the side surfaces of the protruding engagement bodies are brought into contact with the guiding portions 53 of the longitudinal engagement bodies, the protruding engagement bodies are guided to positions corresponding to the specified placement on the rear end side of the housing portion 43 in the presence of the magnetic attraction force, to be specific, positions where the guiding portions 53 meet the longitudinal portions 51. When force is applied in a direction in which the insertion portion 23 gets out of the housing portion 43 in this state, the protruding engagement bodies are locked to the retaining portions 52 of the longitudinal engagement bodies on the side surfaces, which can prevent the insertion portion 23 from getting out of the housing portion 43.

The protruding engagement bodies provided as the male engagement bodies 3 are likely to be more weakly engaged with the female engagement bodies 5 than the longitudinal engagement bodies having an edge structure (or a notch structure) long in the axial direction of the insertion portion 23 of the above-described first aspect; however, the protruding engagement bodies can be strongly engaged with the female engagement bodies 5 by having an increased protruding height or the like. In addition to this, disposing two pairs of the male engagement bodies 3 and the female engagement bodies 5 in positions opposed to each other with respect to the central axes of the insertion portion 23 and the housing portion 43 allows the clasp 1 to have the high degree of freedom in design. When the end faces 22 and 42 of the male base portion 21 and the female base portion 41 have the same outer shape other than a round shape, the same outer shape being point-symmetrical with respect to the central axes of the insertion portion 23 and the housing portion 43, for example, the outer shape of an ellipse, the clasp 1 is capable of satisfying both of operational convenience and freedom in design.

In the present aspect, since the longitudinal engagement bodies including the guiding portions 53 are provided as the female engagement bodies 5 provided on the inner side of the housing portion 43, the male engagement bodies 3 provided to the insertion portion 23 can be guided to the specified placement in the housing portion 43 with a high degree of accuracy. In addition, since the longitudinal engagement bodies that have a relatively complicated shape are provided inside of the less-visible housing portion 43 while the protruding engagement bodies having a simple shape of a pin or a protrusion are provided on the outer periphery of the more-visible insertion portion 23, the effect of improving the appearance of the clasp 1 in a state where the male member 2 is separate from the female member 4 is enhanced.

[Sixth Aspect]

In the sixth aspect of the present invention, protruding engagement bodies are provided as the female engagement bodies 5, which is opposite to the above-described fifth aspect, while longitudinal engagement bodies having an edge structure (or a notch structure) are provided as the male engagement bodies 3, which is the same as the above-described first aspect. Since the longitudinal engagement bodies that have a relatively complicated shape are provided on the outer peripheral surface 23a of the insertion portion 23, the clasp 1 in the present aspect is excellent in manufacturability.

[Seventh Aspect]

A description of a clasp 1' according to the seventh aspect of the present invention will be provided with reference to FIGS. 8 to 11. Also in the present aspect, descriptions of the parts to which configurations common to the above-described aspects can be applied are omitted.

In the clasp 1' according to the present aspect, protruding engagement bodies 6 consisting of pins or protrusions are provided as male engagement bodies on the outer peripheral surface 23a of the insertion portion 23. Meanwhile, combinations of longitudinal engagement bodies 7 and retaining portions 8 are provided as female engagement bodies on the inner peripheral surface 43a of the housing portion 43. Two pairs of male engagement bodies and female engagement bodies having these configurations are provided in positions opposed to each other with respect to central axes of the insertion portion 23 and the housing portion 43. It is to be noted that in the present aspect, the outer shell of the female base portion 41 doubles as the cylindrical housing portion 43, and the inner side of the outer shell of the female base portion 41 defines the inner peripheral surface 43a of the housing portion 43. In addition, the longitudinal engagement bodies 7 are joined to the inner peripheral surface 43a of the housing portion 43 only at axially rear end portions.

The longitudinal engagement bodies 7 have an edge structure protruding from the inner peripheral surface 43a of the housing portion 43 that is a mounting surface. The longitudinal engagement bodies 7 have a size L3 in the longitudinal direction along the axis of the insertion portion 23 that is larger than the protruding height of the longitudinal engagement bodies 7 protruding from the inner peripheral surface 43a. Each of the longitudinal engagement bodies 7 includes a guiding portion including a left guiding portion 72 and a right guiding portion 73 that are disposed symmetrically with a vertex portion 71 interposed therebetween, the vertex portion 71 being placed on the side of the opening 43b of the housing portion 43, as illustrated in a development view of FIG. 9. The left guiding portion 72 and the right guiding portion 73 are formed as end edges of the longitudinal engagement bodies 7 that are inclined with respect to the axis of the housing portion 43, form curved surfaces that are convexed toward the axially rear end, and are inclined so as to spread out toward the axially rear end from the vertex portion 71. The left guiding portion 72 and the right guiding portion 73 are provided in a spiral shape around the central axis of the housing portion 43 while having rotational directions of the spirals opposite to each other.

Stabilizing portions 74 are continuously provided to the left guiding portions 72 and the right guiding portions 73 as concave structures concaved toward the axially rear end, each of the stabilizing portions 74 being disposed at a portion at the axially rear end portion of the housing portion 43 where the right guiding portion 73 of one longitudinal engagement body 7 meets the left guiding portion 72 of the other adjacent longitudinal engagement body 7. The stabilizing portions 74 are capable of making the protruding engagement bodies 6 enter its concave portions to house them. The state where the protruding engagement bodies 6 are housed in the stabilizing portions 74 defines a specified placement that is a final clasped state between a male member 2' and a female member 4'.

The retaining portions 8 are provided on the inner peripheral surface 43a of the housing portion 43 separately from the longitudinal engagement bodies 7. The retaining portions 8 are erected having a structure protruding from the inner peripheral surface 43a of the housing portion 43 along the axis of the housing portion 43 at portions axially closer to the opening side than the stabilizing portions 74. The surfaces on the axially rear end side of the retaining portions 8 define contact surfaces 81 into which the protruding engagement bodies 6 that have gotten out of the stabilizing portions 74 can be brought into contact. Meanwhile, a first inclined surface 83 and a second inclined surface 84 that are inclined to the guiding portions of the longitudinal engagement bodies 7 are provided on the opening side in the axial direction of each of the retaining portions 8 while provided on both sides with a vertex portion 82 as the boundary. The first inclined surface 83 is inclined to the right guiding portion 73 of one longitudinal engagement body 7 while the second inclined surface 84 is inclined to the left guiding portion 72 of the other adjacent longitudinal engagement body 7.

The left guiding portions 72 and the right guiding portions 73 have the functions of guiding the protruding engagement bodies 6 to the positions corresponding to the specified placement, to be specific, the positions where the protruding engagement bodies 6 are housed in the stabilizing portions 74, from both directions of a clockwise direction and a counterclockwise direction with respect to the axis of the housing portion 43 in the presence of the magnetic attraction force by the attraction members 25 and 45. It is to be noted that the clockwise direction and the counterclockwise direction indicate the rotational directions around the central axis of the housing portion 43 for descriptive purposes, and are used just to indicate one and the other of the two rotational directions.

Figure 9:
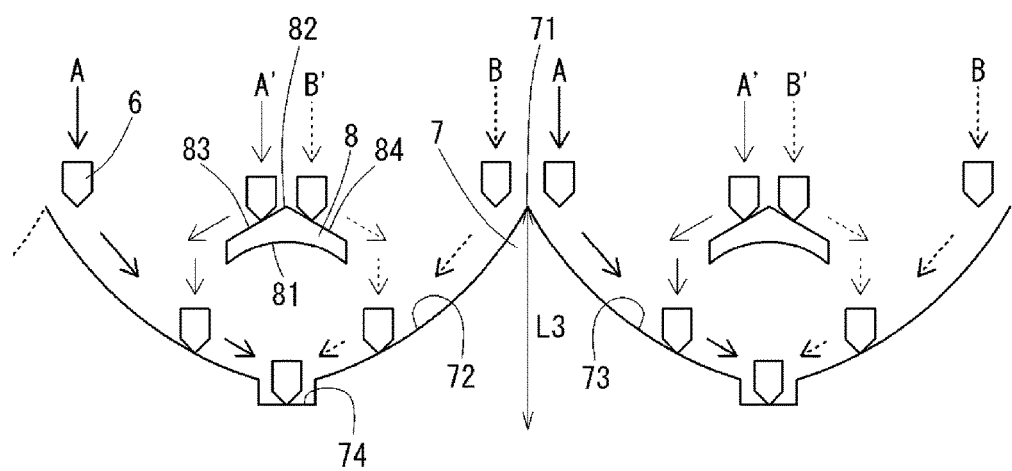
FIG. 9 is a development view of the clasp according to the seventh embodiment of the present invention, showing pairs of engagement bodies in a state where the protruding engagement bodies move along guiding portions.

In clasping the male member 2' and the female member 4' to each other, when the protruding engagement bodies 6 come into contact with the right guiding portions 73, the protruding engagement bodies 6 are guided to the stabilizing portions 74 in the clockwise direction by the right guiding portions 73 to be housed in the stabilizing portions 74 as indicated with the routes A in FIG. 9. Meanwhile, when the protruding engagement bodies 6 come into contact with the left guiding portions 72, the protruding engagement bodies 6 are guided to the stabilizing portions 74 in the counterclockwise direction by the left guiding portions 72 to be housed in the stabilizing portions 74 as indicated with the routes B in FIG. 9. In addition, when the protruding engagement bodies 6 come into contact with the first inclined surfaces 83 of the retaining portions 8, the protruding engagement bodies 6 are guided by the first inclined surfaces 83 to move to the positions where the protruding engagement bodies 6 come into contact with the right guiding portions 73, and further guided to the stabilizing portions 74 by the right guiding portions 73 as indicated with the routes A'. Meanwhile, when the protruding engagement bodies 6 come into contact with the second inclined surfaces 84 of the retaining portions 8, the protruding engagement bodies 6 are guided by the second inclined surfaces 84 to move to the positions where the protruding engagement bodies 6 come into contact with the left guiding portions 72, and further guided to the stabilizing portions 74 by the left guiding portions 72 as indicated with the routes B'. In this manner, the protruding engagement bodies 6 are guided from different positions in the housing 43 to form the specified placement.

Figure 10:
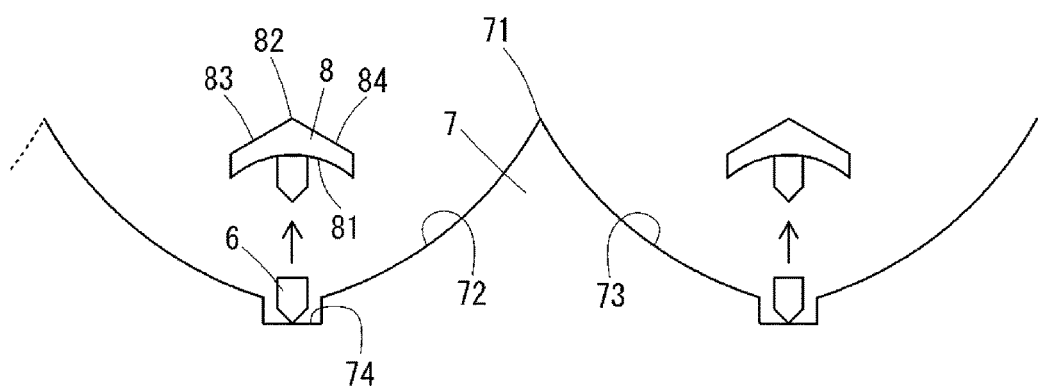
FIG. 10 is a development view of the clasp according to the seventh embodiment of the present invention, showing the pairs of the engagement bodies in a state where the protruding engagement bodies and the retaining portions are locked to each other when force is applied in the axial direction to the clasp without any discretion.

When force is applied in a direction in which the insertion portion 23 gets out of the housing portion 43 in the specified placement where the protruding engagement bodies 6 are housed in the stabilizing portions 74, the protruding engagement bodies 6 come into contact with and get locked to the contact surfaces 81 of the retaining portions 8 as illustrated in FIG. 10. This can prevent the insertion portion 23 from getting out of the housing portion 43. When the application of force stops, the protruding engagement bodies 6 return to the specified placement where the protruding engagement bodies 6 are housed in the stabilizing portions 74, by magnetic attraction force.

Figure 11:
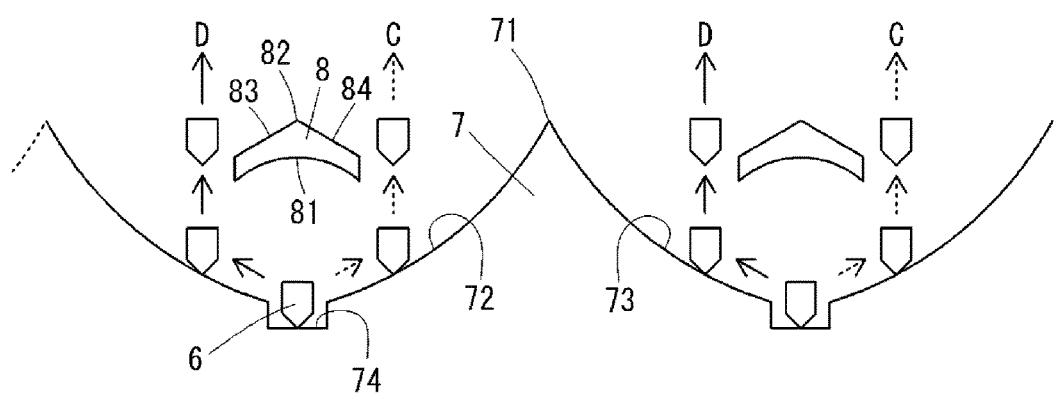
FIG. 11 is a development view of the clasp according to the seventh embodiment of the present invention, showing the pairs of the engagement bodies in a state where the protruding engagement bodies are made to get out of the stabilizing portions to be disengaged.

In releasing the clasping between the male member 2' and the female member 4' from the clasping state by the intention of a user, it is essential only to apply force to pull away the male member 2' and the female member 4' from each other while rotating the male member 2' and the female member 4' in a twisting manner. Then, the protruding engagement bodies 6 get out of the stabilizing portions 74 to move toward the opening in the axial direction of the housing portion 43 so as to climb up the inclination of the left guiding portions 72 or the right guiding portions 73 as illustrated in FIG. 11, whereby the male member 2' and the female member 4' can be pulled away from each other. The clasping can be released equally in both of the case where the male member 2' and the female member 4' are rotated with respect to each other in the clockwise direction and the case where the male member 2' and the female member 4' are rotated with respect to each other in the counterclockwise direction, the directions being indicated as the routes C and routes D in FIG. 11.

In the clasp 1' according to the present aspect, the left guiding portions 72 and the right guiding portions 73 guide the protruding engagement bodies 6 to the stabilizing portions 74 from both the directions of the clockwise direction and the counterclockwise direction, whereby the specified placement can be firmly formed even if the insertion portion 23 is placed in different states in the housing portion 43. In addition, even when the protruding engagement bodies 6 housed in the stabilizing portions 74 are unintentionally vibrated or rotated to almost get out to either of the right and left side, the protruding engagement bodies 6 are made to return to the inside of the stabilizing portions 74 by the left guiding portions 72 and the right guiding portions 73 to be left in the state of being housed in the stabilizing portions 74. Thus, the engagement to maintain the specified placement between the protruding engagement bodies 6 and the longitudinal engagement bodies 7 can be firmly formed. As a result, also in the clasp 1' according to the present aspect, the number of the pairs of the engagement bodies can be reduced to two pairs similarly to the first aspect, and thus the clasp 1' is capable of satisfying both of operational convenience and freedom in design. Similarly to the first aspect, the male base portion 21 and the female base portion 41 may be designed so as to have a twice symmetrical shape around the central axes of the insertion portion 23 and the housing portion 43, and the end faces 22 and 42 of the male base portion 21 and the female base portion 41 may have the shape twice symmetrical or vertically and horizontally symmetrical around the central axes such as an ellipse.

Similarly to the first aspect, a variety of modified aspects are possible also in the clasp 1' according to the present aspect. For example, it is possible to have an aspect in which the protruding engagement bodies 6 are provided on the inner peripheral surface 43*a* of the housing portion 43 while the longitudinal engagement bodies 7 are provided on the outer peripheral surface 23*a* of the insertion portion 23 that is a mounting surface. In addition, instead of having an edge structure protruding from the inner peripheral surface 43*a* of the housing portion 43 or the outer peripheral surface 23*a* of the insertion portion 23 that is a mounting surface, the longitudinal engagement bodies 7 may have a notch structure recessed from the mounting surface.

[Eighth Aspect]

While the stabilizing portions 74 having a concave shape and arranged to house the protruding engagement bodies 6 in the specified placement are provided at portions between the left guiding portions 72 and the right guiding portions 73 of the adjacent longitudinal engagement bodies 7 in the above-described seventh aspect, the stabilizing portions 74 as described above are not provided in the eighth aspect, and the left guiding portions 72 and the right guiding portions 73 of the two adjacent longitudinal engagement bodies 7 directly abut on each other, and the portions between the two adjacent longitudinal engagement bodies 7 have a gentle valley shape. Also in this case, engagement strong to some extent can be achieved between the longitudinal engagement bodies 7 and the protruding engagement bodies 6 by the presence of the left guiding portions 72 and the right guiding portions 73.

While the aspects of the present invention have been illustrated in detail, the present invention is not intended to be limited to the above-described aspects, and various modifications are possible without departing from the scope of the present invention.

The invention claimed is:

1. A clasp comprising a male member that comprises an insertion portion consisting of a columnar body, and a female member that comprises a housing portion having a cylindrical shape and comprising an opening at one end, the housing portion being arranged to house the insertion portion when the insertion portion is inserted thereinto in an axial direction,
   wherein the insertion portion and the housing portion each comprise attraction members arranged to attract the insertion portion into the housing portion by magnetic attraction force,
   wherein the male member comprises a male engagement body on an outer peripheral surface of the insertion portion,
   wherein the female member comprises a female engagement body on an inner peripheral surface of the housing portion,
   wherein the male engagement body comprises a male longitudinal portion and a male retaining portion that are of a monolithic construction,
   wherein the female engagement body comprises a female longitudinal portion and a female retaining portion that are of a monolithic construction,
   wherein the male engagement body has one of an edge structure protruding from the outer peripheral surface of the insertion portion and a notch structure recessed from the outer peripheral surface of the insertion portion, and the male longitudinal portion has a size in a longitudinal direction along an axis of the insertion portion that is larger than one of a protruding height of the edge structure and a recessed depth of the notch structure,
   wherein the female engagement body has one of an edge structure protruding from the inner peripheral surface of the housing portion and a notch structure recessed from the inner peripheral surface of the housing portion, and the female longitudinal portion has a size in a longitudinal direction along an axis of the housing portion that is larger than one of a protruding height of the edge structure and a recessed depth of the notch structure,
   wherein the size of the male longitudinal portion in a longitudinal direction along an axis of the insertion portion and that of the female longitudinal portion in a longitudinal direction along an axis of the housing portion are substantially the same,
   wherein the male retaining portion and the female retaining portion are capable of preventing, by being locked to each other, the insertion portion from getting out of the housing portion in the axial direction when the insertion portion and the housing portion are in a specified placement where the insertion portion is inserted into the housing portion at a predetermined rotation angle up to a predetermined depth,
   wherein the male engagement body and the female engagement body are engageable with each other at a plurality of positions along the longitudinal directions of the male engagement body and the female engagement body in the specified placement,
   wherein the clasp further comprises at least one of a male guiding portion that is provided to the male engagement body, the male guiding portion and the male engagement body being of a monolithic construction, and a female guiding portion that is provided to the female engagement body, the female guiding portion and the female engagement body being of a monolithic construction,
   wherein the male guiding portion is formed as an end edge of the male engagement body that is inclined with respect to the male longitudinal portion, and is arranged to guide the female engagement body when the female engagement body is brought into contact with the male guiding portion to a position corresponding to the specified placement in the presence of the magnetic attraction force by the attraction members, and
   wherein the female guiding portion is formed as an end edge of the female engagement body that is inclined with respect to the female longitudinal portion, and is arranged to guide the male engagement body when the male engagement body is brought into contact with the female guiding portion to a position corresponding to the specified placement in the presence of the magnetic attraction force by the attraction members.

2. The clasp according to claim 1, wherein the male engagement body is provided to the insertion portion over an entire area of the insertion portion in the axial direction, and the female engagement body is provided to the housing portion over an entire area of the hosing portion in the axial direction.

3. The clasp according to claim 2,
   wherein the male engagement body and the female engagement body have the edge structures, and
   wherein the clasp comprises only the female guiding portion among the male guiding portion and the female guiding portion.

4. The clasp according to claim 3, wherein the clasp comprises two pairs of the male engagement bodies and the female engagement bodies, the pairs being disposed in positions opposed to each other with respect to central axes of the insertion portion and the housing portion.

5. The clasp according to claim 4,
wherein the male member comprises a male base portion supporting the insertion portion, the insertion portion being erected from an end face of the male base portion,
wherein the female member comprises a female base portion surrounding the housing portion, the housing portion being recessed from an end face of the female base portion, and
wherein the end faces of the male base portion and the female base portion have a same outer shape other than a round shape, the same outer shape being point-symmetrical with respect to the central axes of the insertion portion and the housing portion, and are arranged to be in contact with each other over their entire surfaces in the specified placement.

6. The clasp according to claim 1,
wherein the male engagement body and the female engagement body have the edge structures, and
wherein the clasp comprises only the female guiding portion among the male guiding portion and the female guiding portion.

7. The clasp according to claim 1, wherein the clasp comprises two pairs of the male engagement bodies and the female engagement bodies, the pairs being disposed in positions opposed to each other with respect to central axes of the insertion portion and the housing portion.

8. The clasp according to claim 7,
wherein the male member comprises a male base portion supporting the insertion portion, the insertion portion being erected from an end face of the male base portion,
wherein the female member comprises a female base portion surrounding the housing portion, the housing portion being recessed from an end face of the female base portion, and
wherein the end faces of the male base portion and the female base portion have a same outer shape other than a round shape, the same outer shape being point-symmetrical with respect to the central axes of the insertion portion and the housing portion, and are arranged to be in contact with each other over their entire surfaces in the specified placement.

9. A clasp comprising a male member that comprises an insertion portion consisting of a columnar body, and comprising a female member that comprises a housing portion having a cylindrical shape and comprising an opening at one end, the housing portion being arranged to house the columnar body when the columnar body is inserted thereinto in an axial direction,
wherein the insertion portion and the housing portion each comprise attraction members arranged to attract the insertion portion into the housing portion by magnetic attraction force,
wherein the male member comprises male engagement bodies on an outer peripheral surface of the insertion portion,
wherein the female member comprises female engagement bodies on an inner peripheral surface of the housing portion,
wherein the male engagement bodies or the female engagement bodies are protruding engagement bodies comprising a pin or a protrusion erected from the outer peripheral surface of the insertion portion or the inner peripheral surface of the housing portion while the other the male engagement bodies and the female engagement bodies comprise a longitudinal engagement body and a retaining portion which are formed separately from each other, each longitudinal body comprising two guiding portions which are oriented in opposite directions from each other along the rotation directions of the clasp, and the longitudinal engagement body and the retaining portion being provided on a mounting surface that is selected from the outer peripheral surface of the insertion portion and the inner peripheral surface of the housing portion,
wherein the longitudinal engagement body has one of an edge structure protruding from the mounting surface and a notch structure recessed from the mounting surface, and the longitudinal engagement body has a size in a longitudinal direction along an axis of one of the insertion portion and the housing portion that is larger than one of a protruding height of the edge structure and a recessed depth of the notch structure,
wherein the protruding engagement bodies and the retaining portions are capable of preventing, by being locked to each other, the insertion portion from getting out of the housing portion in the axial direction when the insertion portion and the housing portion are in a specified placement where the insertion portion is inserted into the housing portion at a predetermined rotation angle up to a predetermined depth, and
wherein the two guiding portions of each longitudinal portion are formed as end edges of a longitudinal engagement body that are inclined in opposite directions from each other with respect to the axis of the insertion portion or the housing portion, and are arranged to guide a protruding engagement body, when the protruding engagement body is brought into contact with one of the two guiding portions of a longitudinal engagement body, to a position corresponding to the specified placement from a clockwise direction or a counterclockwise direction, depending on with which of the two guiding portions the protruding engagement body comes in contact, with respect to the axis of the insertion portion or the housing portion in the presence of the magnetic attraction force by the attraction members.

10. The clasp according to claim 9,
wherein the male engagement body is the protruding engagement body while the female engagement body is the combination of the longitudinal engagement body and the retaining portion, the longitudinal engagement body comprising the edge structure.

11. The clasp according to claim 10,
further comprising a stabilizing portion continuously provided to the guiding portion, the stabilizing portion comprising a concave structure arranged to house the protruding engagement body in the specified placement.

12. The clasp according to claim 11,
wherein the longitudinal engagement body is provided to one of the insertion portion and the housing portion over an entire area thereof in the axial direction.

13. The clasp according to claim 12,
wherein the clasp comprises two pairs of the male engagement bodies and the female engagement bodies, the pairs being disposed in positions opposed to each other with respect to central axes of the insertion portion and the housing portion.

14. The clasp according to claim 13,
wherein the male member comprises a male base portion supporting the insertion portion, the insertion portion being erected from an end face of the male base portion,
wherein the female member comprises a female base portion housing the housing portion, the housing portion being recessed from an end face of the female base portion, and
wherein the end faces of the male base portion and the female base portion have a same outer shape other than a round shape, the same outer shape being point-symmetrical with respect to the central axes of the insertion portion and the housing portion, and are arranged to be in contact with each other over their entire surfaces in the specified placement.

15. The clasp according to claim 9,
further comprising a stabilizing portion continuously provided to the guiding portion, the stabilizing portion comprising a concave structure arranged to house the protruding engagement body in the specified placement.

16. The clasp according to claim 9,
wherein the longitudinal engagement body is provided to one of the insertion portion and the housing portion over an entire area thereof in the axial direction.

17. The clasp according to claim 9,
wherein the clasp comprises two pairs of the male engagement bodies and the female engagement bodies, the pairs being disposed in positions opposed to each other with respect to central axes of the insertion portion and the housing portion.

18. The clasp according to claim 17,
wherein the male member comprises a male base portion supporting the insertion portion, the insertion portion being erected from an end face of the male base portion,
wherein the female member comprises a female base portion housing the housing portion, the housing portion being recessed from an end face of the female base portion, and
wherein the end faces of the male base portion and the female base portion have a same outer shape other than a round shape, the same outer shape being point-symmetrical with respect to the central axes of the insertion portion and the housing portion, and are arranged to be in contact with each other over their entire surfaces in the specified placement.

* * * * *